United States Patent
Li et al.

(10) Patent No.: US 9,807,479 B2
(45) Date of Patent: Oct. 31, 2017

(54) ADAPTIVE COMPENSATION CONTROL METHOD AND MODULE, AND OPTICAL SWITCHING SYSTEM

(71) Applicant: Huawei Technologies Co., Ltd., Shenzhen (CN)

(72) Inventors: Shuaibing Li, Shenzhen (CN); Huixiao Ma, Shenzhen (CN); Xiaoling Yang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/218,812

(22) Filed: Jul. 25, 2016

(65) Prior Publication Data

US 2016/0337729 A1    Nov. 17, 2016

Related U.S. Application Data

(63) Continuation of application No. PCT/CN2014/071455, filed on Jan. 26, 2014.

(51) Int. Cl.
*H04Q 11/00* (2006.01)
*H04B 10/25* (2013.01)

(52) U.S. Cl.
CPC ......... *H04Q 11/0005* (2013.01); *H04B 10/25* (2013.01); *H04Q 2011/005* (2013.01); *H04Q 2011/0039* (2013.01); *H04Q 2011/0058* (2013.01)

(58) Field of Classification Search
None
See application file for complete search history.

(56) References Cited

U.S. PATENT DOCUMENTS

| | | | | |
|---|---|---|---|---|
| 5,724,393 | A | * | 3/1998 | Dagdeviren ........ H04L 25/4927 375/222 |
| 6,545,781 | B1 | | 4/2003 | Chang et al. |
| 7,218,818 | B2 | | 5/2007 | Fukashiro et al. |
| 7,435,013 | B2 | | 10/2008 | Hirai et al. |

(Continued)

FOREIGN PATENT DOCUMENTS

| | | |
|---|---|---|
| CN | 1790072 A | 6/2006 |
| CN | 101005330 A | 7/2007 |

(Continued)

OTHER PUBLICATIONS

Blumenthal, D.J. et al., "Photonic Packet Switches: Architectures and Experimental Implementations," Proceedings of the IEEE, vol. 82, No. 11, Nov. 1994, 18 pages.

*Primary Examiner* — Darren E Wolf
(74) *Attorney, Agent, or Firm* — Slater Matsil, LLP

(57) ABSTRACT

An adaptive compensation control method for optical communications technologies, which includes acquiring optical label information of an optical signal, where the optical label information carries information about a destination receive port of the optical signal, determining, according to the information about the destination receive port of the optical signal, a switching path, in an optical switch switching matrix, of the optical signal, and determining an optical switch compensation value of the optical signal according to a preset compensation value of each optical switch cell on the switching path, where the optical switch compensation value is used to compensate the optical signal.

19 Claims, 9 Drawing Sheets

(56) References Cited

U.S. PATENT DOCUMENTS

| | | | |
|---|---|---|---|
| 2004/0013429 A1* | 1/2004 | Duelk | H04Q 11/0005 398/45 |
| 2006/0098156 A1 | 5/2006 | Frisken et al. | |
| 2013/0058645 A1 | 3/2013 | Saito et al. | |

FOREIGN PATENT DOCUMENTS

| | | |
|---|---|---|
| CN | 102377725 A | 3/2012 |
| EP | 3081969 A1 | 10/2016 |

\* cited by examiner

ADAPTIVE COMPENSATION CONTROL METHOD AND MODULE, AND OPTICAL SWITCHING SYSTEM

CROSS-REFERENCE TO RELATED APPLICATIONS

This application is a continuation of International Application No. PCT/CN2014/071455, filed on Jan. 26, 2014, which is hereby incorporated by reference in its entirety.

TECHNICAL FIELD

The present invention relates to the field of optical communication technologies, and in particular, to an adaptive compensation control method and module, and an optical switching system.

BACKGROUND

Due to characteristics such as low energy consumption and a high capacity, an optical switch attracts increasing attention. A core of the optical switch is an optical switch switching matrix. The optical switch switching matrix generally includes many optical switch cells according to a specific rule. In the optical switch, establishment of a switching path is implemented by changing statuses of these optical switch cells. However, due to process limits, it is very difficult to manufacture, by using whichever optical switch technology, two optical switch cells having totally same performance, as a result, different optical switch cells cause different losses to a signal. Therefore, a switching path on which multilevel optical switch cells are cascaded inevitably causes different losses to a signal.

In conclusion, due to defects of the optical switch switching matrix, after optical switching is performed, a relatively large difference inevitably exists between parameters, such as powers, phases, and polarization states, of optical signals received at a same receive port. The difference increases difficulty in subsequent signal processing and increases a bit error rate of a system.

FIG. 1 shows a technical solution for resolving a problem of an unequalized link power. In the technical solution, some data of an optical packet passes through an optical switch, and is then converted into an electrical signal by means of optical-to-electrical conversion, and the electrical signal enters an optical packet receiving apparatus. A detection control unit of the optical packet receiving apparatus is configured to detect parameter values, such as an average power, a packet density, an extinction ratio (ER) value, and a switch switching time, of a signal of some data of a switched optical packet, and then send these parameter values to an information collection unit. A peak power calculation unit obtains a peak power of the optical packet by means of calculation according to information in the information collection unit, and then sends the peak power of the optical packet to a control unit. When determining that the peak power of the optical packet is less than a preset value, the control unit instructs an upper-level switch to adjust a transmit power of a transmit port or adjust a gain of an amplifier of a current-level optical packet switching apparatus, to compensate a power of the optical packet.

However, in this manner, because a compensation value of an optical signal needs to be calculated according to parameter values of a signal of some data of a switched optical packet, a delay exists, and the optical signal cannot be quickly compensated.

SUMMARY

Embodiments of the present invention provide an adaptive compensation control method and module, and an optical switching system, which can quickly determine, before switching of an optical packet, a compensation value of the optical packet, so that after the optical packet is compensated according to the compensation value, an objective of optical signal equalization at a receive port of an optical switch is achieved.

To achieve the foregoing objective, the following technical solutions are used in the embodiments of the present invention.

According to a first aspect, an embodiment of the present invention provides an adaptive compensation control method, where the method includes acquiring optical label information of an optical signal, where the optical label information carries information about a destination receive port of the optical signal, determining, according to the information about the destination receive port of the optical signal, a switching path, in an optical switch switching matrix, of the optical signal, and determining an optical switch compensation value of the optical signal according to a preset compensation value of each optical switch cell on the switching path, where the optical switch compensation value is used to compensate the optical signal.

In a first possible implementation manner, with reference to the first aspect, the preset compensation value of each optical switch cell is a preset power compensation value of each optical switch cell, and the optical switch compensation value is an optical switch power compensation value, the determining an optical switch compensation value of the optical signal according to a preset compensation value of each optical switch cell on the switching path specifically includes determining the optical switch power compensation value of the optical signal according to the preset power compensation value of each optical switch cell on the switching path. In some embodiments, the method further includes determining a sum of a link power compensation value of the optical signal and the optical switch power compensation value as a power compensation value of the optical signal, where the power compensation value of the optical signal is used to compensate a power of the optical signal.

In a second possible implementation manner, according to the first possible implementation manner, before the acquiring optical label information of an optical signal, the method further includes performing optical-to-electrical conversion on a part of the optical signal, whose power is of a preset proportion, in the optical signal, to obtain an electrical signal, splitting the electrical signal into a first part of electrical signal and a second part of electrical signal, where the first part of electrical signal occupies a first proportion of the electrical signal, and the second part of electrical signal occupies a second proportion of the electrical signal, and detecting a power value of the first part of electrical signal. The method further includes obtaining a power value of the optical signal according to the power value of the first part of electrical signal, the first proportion, and the preset proportion, and obtaining the link power compensation value of the optical signal according to the power value of the optical signal and a preset target power value. The acquiring optical label information of an optical signal specifically includes reading, from the second part of electrical signal, the optical label information of the optical signal.

In a third possible implementation manner, with reference to the first aspect or according to the first possible implementation manner and the second possible implementation manner, the preset compensation value of each optical switch cell is a preset phase compensation value of each optical switch cell, and the optical switch compensation value is an optical switch phase compensation value. The determining an optical switch compensation value of the optical signal according to a preset compensation value of each optical switch cell on the switching path, where the optical switch compensation value is used to compensate the optical signal includes, determining the optical switch phase compensation value of the optical signal according to the preset phase compensation value of each optical switch cell on the switching path, where a phase compensation value of the optical signal is used to compensate a phase of the optical signal.

In a fourth possible implementation manner, with reference to the first aspect or according to the first possible implementation manner and the second possible implementation manner, the preset compensation value of each optical switch cell is a preset polarization state compensation value of each optical switch cell, and the optical switch compensation value is an optical switch polarization state compensation value. The determining an optical switch compensation value of the optical signal according to a preset compensation value of each optical switch cell on the switching path, where the optical switch compensation value is used to compensate the optical signal includes determining the optical switch polarization state compensation value of the optical signal according to the preset polarization state compensation value of each optical switch cell on the switching path, where a polarization state compensation value of the optical signal is used to compensate a polarization state of the optical signal.

In a fifth possible implementation manner, with reference to the first aspect or according to the first possible implementation manner to the fourth possible implementation manner, the information about the destination receive port includes a number of the destination receive port. The determining an optical switch compensation value of the optical signal according to a preset compensation value of each optical switch cell on the switching path specifically includes performing matching in a preset optical switch configuration table by using a number of a transmit port, to which the optical signal is transmitted, of the optical switch switching matrix and the number of the destination receive port as indexes, to determine the optical switch compensation value of the optical signal. The preset optical switch configuration table includes a one-to-one correspondence among a number of a transmit port of the optical switch switching matrix, a number of a destination receive port, and an optical switch compensation value.

In a sixth possible implementation manner, according to the fifth possible implementation manner, the method further includes detecting an output value of a destination receive port, to which the optical signal is transmitted, of the optical switch switching matrix, obtaining a difference value between the output value of the destination receive port and a preset target value of the optical signal; and, if the difference value is greater than a preset modification threshold, modifying, in the preset optical switch configuration table, the optical switch compensation value of the optical signal by using the number of the transmit port, to which the optical signal is transmitted, of the optical switch switching matrix and the number of the destination receive port as indexes.

In a seventh possible implementation manner, according to the fifth possible implementation manner, the method further includes detecting a value that is obtained after the optical signal is compensated and an output value of a destination receive port, to which the optical signal is transmitted, of the optical switch switching matrix, obtaining a difference value between the value that is obtained after the optical signal is compensated and the output value of the destination receive port, and, if the difference value is greater than a preset modification threshold, modifying, in the preset optical switch configuration table, the optical switch compensation value of the optical signal by using the number of the transmit port, to which the optical signal is transmitted, of the optical switch switching matrix and the number of the destination receive port as indexes.

According to a second aspect, the present invention provides an adaptive compensation control module, including an acquiring unit, a first determining unit, and a second determining unit. The acquiring unit is configured to acquire optical label information of an optical signal, where the optical label information carries information about a destination receive port of the optical signal. The first determining unit is configured to determine, according to the information about the destination receive port of the optical signal, a switching path, in an optical switch switching matrix, of the optical signal. The second determining unit is configured to determine an optical switch compensation value of the optical signal according to a preset compensation value of each optical switch cell on the switching path, where the optical switch compensation value is used to compensate the optical signal.

In a first possible implementation manner, with reference to the second aspect, the preset compensation value of each optical switch cell is a preset power compensation value of each optical switch cell, and the optical switch compensation value is an optical switch power compensation value. The second determining unit is specifically configured to determine the optical switch power compensation value of the optical signal according to the preset power compensation value of each optical switch cell on the switching path. The module further includes a power compensation value determining unit, where the power compensation value determining unit is configured to determine a sum of a link power compensation value of the optical signal and the optical switch power compensation value as a power compensation value of the optical signal, and where the power compensation value of the optical signal is used to compensate a power of the optical signal.

In a second possible implementation manner, according to the first possible implementation manner, the module further includes an optical-to-electrical conversion unit, a signal splitting unit, a power detection unit, an optical signal power determining unit, and a link power compensation value determining unit. The optical-to-electrical conversion unit is configured to perform optical-to-electrical conversion on a part of the optical signal, whose power is of a preset proportion, in the optical signal, to obtain an electrical signal. The signal splitting unit is configured to split the electrical signal into a first part of electrical signal and a second part of electrical signal, where the first part of electrical signal occupies a first proportion of the electrical signal, and the second part of electrical signal occupies a second proportion of the electrical signal. The power detection unit is configured to detect a power value of the first part of electrical signal. The optical signal power determining unit is configured to obtain a power value of the optical signal according to a power value of a first part of electrical signal of each link, the first proportion, and the preset proportion. The link power compensation value determining unit is configured to obtain the link power compensation value of the optical signal according to the power value of the optical signal and a preset target power value. The acquiring unit is specifically configured to read, from the second part of electrical signal, the optical label information of the optical signal.

In a third possible implementation manner, with reference to the second aspect or according to the first possible implementation manner and the second possible implementation manner, the preset compensation value of each optical switch cell is a preset phase compensation value of each optical switch cell, and the optical switch compensation value is an optical switch phase compensation value. The second determining unit is specifically configured to determine the optical switch phase compensation value of the optical signal according to the preset phase compensation value of each optical switch cell on the switching path, where a phase compensation value of the optical signal is used to compensate a phase of the optical signal.

In a fourth possible implementation manner, with reference to the second aspect or according to the first possible implementation manner and the second possible implementation manner, the preset compensation value of each optical switch cell is a preset polarization state compensation value of each optical switch cell, and the optical switch compensation value is an optical switch polarization state compensation value. The second determining unit is specifically configured to determine the optical switch polarization state compensation value of the optical signal according to the preset polarization state compensation value of each optical switch cell on the switching path, where a polarization state compensation value of the optical signal is used to compensate a polarization state of the optical signal.

In a fifth possible implementation manner, with reference to the second aspect or according to the first possible implementation manner to the fourth possible implementation manner, the information about the destination receive port includes a number of the destination receive port. The second determining unit is specifically configured to perform matching in a preset optical switch configuration table by using a number of a transmit port, to which the optical signal is transmitted, of the optical switch switching matrix and the number of the destination receive port as indexes, to determine the optical switch compensation value of the optical signal. The preset optical switch configuration table includes a one-to-one correspondence between a number of a transmit port of the optical switch switching matrix, a number of a destination receive port, and an optical switch compensation value.

In a sixth possible implementation manner, according to the fifth possible implementation manner, the module further includes a first detection unit, a first obtaining unit, and a first modification unit. The first detection unit is configured to detect an output value of a destination receive port, to which the optical signal is transmitted, of the optical switch switching matrix. The first obtaining unit is configured to obtain a difference value between the output value of the destination receive port and a preset target value of the optical signal. The first modification unit is configured to: if the difference value is greater than a preset modification threshold, modify, in the preset optical switch configuration table, the optical switch compensation value of the optical signal by using the number of the transmit port, to which the optical signal is transmitted, of the optical switch switching matrix and the number of the destination receive port as indexes.

In a seventh possible implementation manner, according to the fifth possible implementation manner, the module further includes a second detection unit, a second obtaining unit, and a second modification unit. The second detection unit is configured to detect a value that is obtained after the optical signal is compensated and an output value of a destination receive port, to which the optical signal is transmitted, of the optical switch switching matrix. The second obtaining unit is configured to obtain a difference value between the value that is obtained after the optical signal is compensated and the output value of the destination receive port. The second modification unit is configured to: if the difference value is greater than a preset modification threshold, modify, in the preset optical switch configuration table, the optical switch compensation value of the optical signal by using the number of the transmit port, to which the optical signal is transmitted, of the optical switch switching matrix and the number of the destination receive port as indexes.

According to a third aspect, the present invention provides an optical switching system, where the optical switching system includes an optical switch switching matrix, the adaptive compensation control module provided above, and an adaptive compensation module. The adaptive compensation control module is configured to send an optical switch compensation value of an optical signal to the adaptive compensation module. The adaptive compensation module is configured to receive the optical switch compensation value, sent by the adaptive compensation control module, of the optical signal; and compensate the optical signal according to the optical switch compensation value of the optical signal, and send the optical signal to the optical switch switching matrix. The optical switch switching matrix is configured to receive the compensated optical signal sent by the adaptive compensation module, and perform optical switching on the compensated optical signal.

The embodiments of the present invention provide an adaptive compensation control method. The method includes acquiring optical label information of an optical signal, where the optical label information carries information about a destination receive port of the optical signal; determining, according to the information about the destination receive port of the optical signal, a switching path, in an optical switch switching matrix, of the optical signal; and determining an optical switch compensation value of the optical signal according to a preset compensation value of each optical switch cell on the switching path, where the optical switch compensation value is used to compensate the optical signal. Based on the technical solution, because a switching path, in an optical switching matrix, of the optical signal may be determined according to information about a destination receive port of each link, and optical switch cells included on each switching path are fixed, a compensation value of the optical signal may be determined according to a preset compensation value of each optical switch cell on the optical switching path, and a compensation value of an optical packet does not need to be measured by using a feedback loop, which can quickly determine, before switching of an optical packet, a compensation value of the optical packet, so that after the optical packet is compensated according to the compensation value, an objective of optical signal equalization at a receive port of an optical switch is achieved.

BRIEF DESCRIPTION OF THE DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
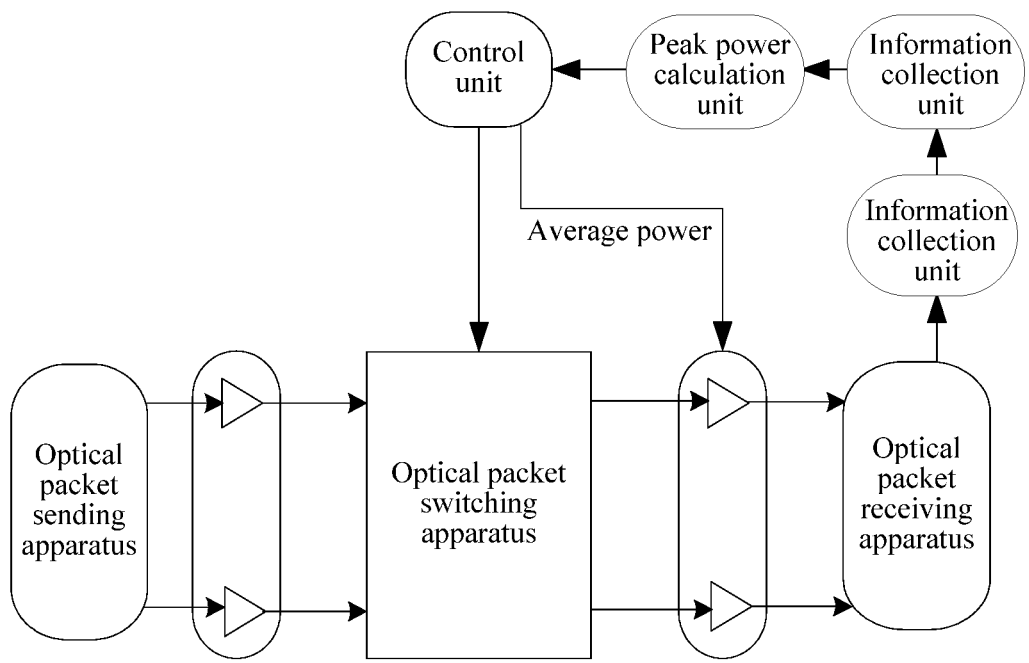
FIG. 1 is a schematic structural diagram of optical packet power compensation in the prior art.

As shown in FIG. 1, in the prior art, a power compensation value of an optical packet signal of each link is obtained by means of calculation by using some switched data of an optical packet, that is, obtained by a receiving apparatus end of an optical switch switching matrix by performing detection on the switched data, and is then fed back to a front end of the optical switch switching matrix by using a feedback loop. This causes a delay to optical packet signal power compensation, and also requires a complex feedback loop.

Figure 2:
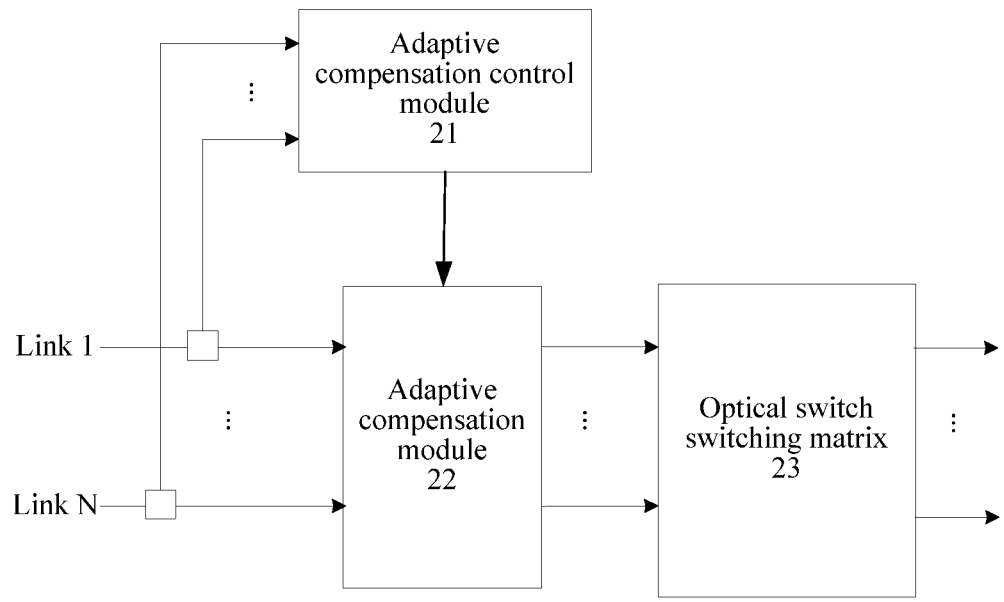
FIG. 2 is a schematic structural diagram of an optical switching system according to an embodiment of the present invention.

An embodiment of the present invention provides an optical switching system. As shown in FIG. 2, the optical switching system includes an adaptive compensation control module 21, an adaptive compensation module 22, and an optical switch switching matrix 23.

The adaptive compensation control module 21 is configured to acquire optical label information of an optical signal, where the optical label information carries information about a destination receive port of the optical signal, determine, according to the information about the destination receive port of the optical signal, a switching path, in the optical switch switching matrix, of the optical signal, determine an optical switch compensation value of the optical signal according to a preset compensation value of each optical switch cell on the switching path, where the optical switch compensation value is used to compensate the optical signal; and send the optical switch compensation value of the optical signal to the adaptive compensation module 22.

The adaptive compensation module 22 is configured to receive the optical switch compensation value, sent by the adaptive compensation control module 21, of the optical signal; and compensate the optical signal according to the optical switch compensation value of the optical signal, and send the optical signal to the optical switch switching matrix 23.

The optical switch switching matrix 23 is configured to receive the compensated optical signal sent by the adaptive compensation module 22, and perform optical switching on the compensated optical signal.

It should be noted that, in a process in which the adaptive compensation control module 21 determines the optical switch compensation value of the optical signal, after determining the switching path, in the optical switch switching matrix 23, of the optical signal, the adaptive compensation control module 21 may further accordingly generate a switching path control signal of the optical signal. After the adaptive compensation module 22 compensates the optical signal and sends the compensated optical signal to the optical switch switching matrix 23, the optical switch switching matrix 23 drives a corresponding optical switch cell according to the switching path control signal, and switches, in a cut-through switching mode, the compensated optical signal.

An optical signal input to the optical switching system is a signal transmitted from an upper-level switching node or a user side to the optical switching system.

Figure 3:
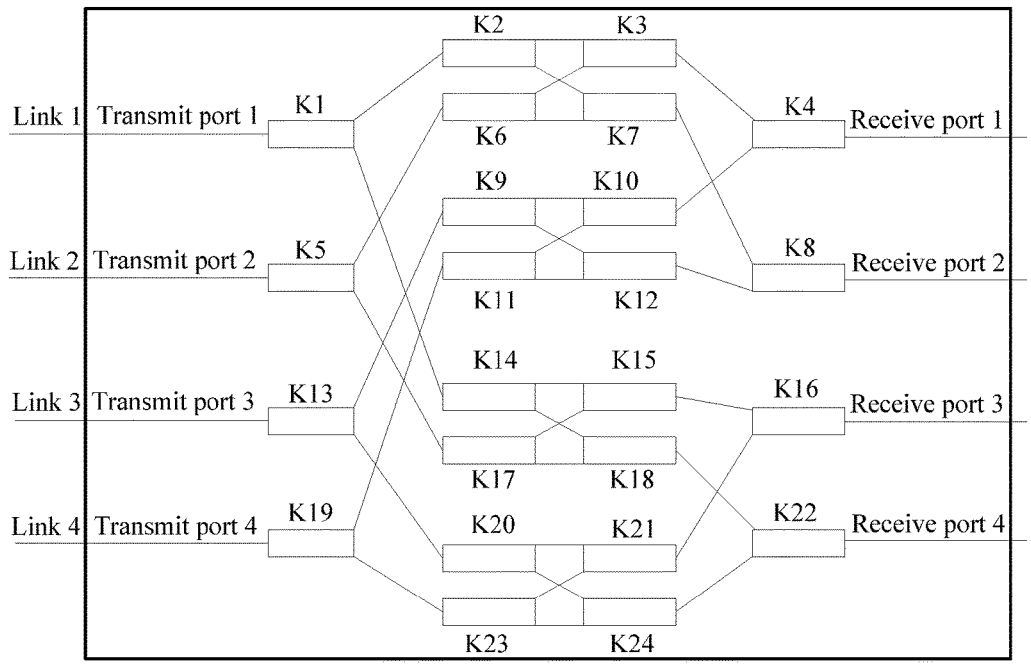
FIG. 3 is a schematic structural diagram of a 4*4 optical switch switching matrix.

Specifically, the optical switch switching matrix 23 is generally an N*N matrix, which has N transmit ports and N receive ports, where multiple optical switch cells connected according to a specific rule are included between the transmit ports and the receive ports, for example, a 4*4 optical switch switching matrix shown in FIG. 3. Corresponding to the N transmit ports and the N receive ports of the optical switch switching matrix 23, the optical switching system can perform optical switching in parallel on optical signals of N links.

For the optical signals, each of which is from the upper-level switching node or the user side, of the N links, an optical signal of each link is split and sent to the adaptive compensation control module 21 and the adaptive compensation module 22. The adaptive compensation control module 21 determines optical switch compensation values of optical signals transmitted on links 1-N, and then sends, to the adaptive compensation module 22, the optical switch compensation values of the optical signals transmitted on the links 1-N. After receiving the optical switch compensation values of the optical signals transmitted on the links 1-N, the adaptive compensation module 22 compensates the optical signals, which are input to the adaptive compensation module 22, of the links 1-N, and then correspondingly sends the compensated optical signals on the links 1-N to corresponding transmit ports of the optical switch switching matrix 23. The optical switch switching matrix 23 switches, in a cut-through switching mode, the compensated optical signals of the links 1-N to corresponding receive ports by using the corresponding transmit ports.

It should be noted that, after an optical signal of each link is compensated by the adaptive compensation module 22, the optical signal is correspondingly input to a transmit port of the optical switch switching matrix 23. That is, as shown in FIG. 3, after being compensated by the adaptive compensation module 22, an optical signal of a link 1 is transmitted to a transmit port 1; after being compensated by the adaptive compensation module 22, an optical signal of a link 2 is transmitted to a transmit port 2; after being compensated by the adaptive compensation module 22, an optical signal of a link 3 is transmitted to a transmit port 3; and after being compensated by the adaptive compensation module 22, an optical signal of a link 4 is transmitted to a transmit port 4.

Exemplarily, according to the 4*4 optical switch switching matrix 30 shown in FIG. 3, the optical switch switching matrix 30 includes 24 optical switch cells, four transmit ports and four receive ports. After being compensated by the adaptive compensation module 22, optical signals of links 1-4 are switched, in a cut-through switching mode, respectively from transmit ports 1-4 to different receive ports.

Even though optical switch cells through which compensated optical signals of all links pass when the compensated optical signals are switched in a cut-through switching mode in the optical switch switching matrix are different, in a case in which a transmit port and a receive port, through which an optical signal of each link passes, of the optical switch switching matrix are fixed, optical switch switching cells included in a switching path from the transmit port to the receive port are fixed. For example, a switching path for switching, in a cut-through switching mode, from the transmit port 1 to a receive port 2 includes an optical switch cell K1, an optical switch cell K2, an optical switch cell K7, and an optical switch cell K8. A switching path for switching, in a cut-through switching mode, from the transmit port 2 to a receive port 1 includes an optical switch cell K5, an optical switch cell K6, an optical switch cell K3, and an optical switch cell K4.

The 4*4 optical switch switching matrix 30 shown in FIG. 3 may have 16 switching paths, and each switching path includes fixed optical switch cells. Exemplarily, reference may be made to Table 1.

TABLE 1

| Switching path number | Transmit port | Receive port | Included optical switch cells |
| --- | --- | --- | --- |
| 1 | 1 | 1 | K1, K2, K3, K4 |
| 2 | 1 | 2 | K1, K2, K7, K8 |
| 3 | 1 | 3 | K1, K14, K15, K16 |
| 4 | 1 | 4 | K1, K14, K18, K22 |
| 5 | 2 | 1 | K5, K6, K3, K4 |
| 6 | 2 | 2 | K5, K6, K7, K8 |
| 7 | 2 | 3 | K5, K17, K15, K16 |
| 8 | 2 | 4 | K5, K17, K18, K22 |
| 9 | 3 | 1 | K13, K9, K10, K4 |
| 10 | 3 | 2 | K13, K9, K12, K8 |
| 11 | 3 | 3 | K13, K20, K21, K16 |
| 12 | 3 | 4 | K13, K20, K24, K22 |
| 13 | 4 | 1 | K19, K11, K10, K4 |
| 14 | 4 | 2 | K19, K11, K12, K8 |
| 15 | 4 | 3 | K19, K23, K21, K16 |
| 16 | 4 | 4 | K19, K23, K24, K22 |

It should be noted that, after a receive port receives an optical signal, before performing receiving processing on the optical signal, the optical switching system needs to convert the optical signal to an electrical signal. However, if a power of the signal received by the receive port of the optical switching system is too small, due to a factor such as non-linearity of an optical-to-electrical conversion system, the optical signal cannot be converted; if a power of the received optical signal is too large, an optical-to-electrical conversion module is damaged. Based on this, in order that normal optical-to-electrical conversion and subsequent processing can be performed on an optical signal, a power of an optical signal received by each receive port of the optical switching system needs to be kept in a specific range, that is, power equalization of the optical signal received by each receive port needs to be ensured. Further, in a coherent system or a polarization multiplexing system, after an optical signal is switched by an optical switch switching matrix, because performance of different optical switch cells is different, and a phase or a polarization state of the optical signal may also change, which causes an optical signal decoding error at a receive port. In this case, the optical switching system may further need to compensate a parameter such as the phase or the polarization state of the optical signal. Based on this, the optical switching system provided in this embodiment of the present invention is applicable to compensating various parameters of an optical signal, such as a power, a phase, and a polarization state. Certainly, the power, the phase, and the polarization state are used as examples for description in this embodiment of the present invention, but the present invention is not limited to that only the foregoing three parameters can be compensated. As long as the adaptive compensation control method provided in the embodiments of the present invention is used to determine a compensation value of another performance parameter of an optical signal, and the switching system provided in the embodiments of the present invention is used to compensate another performance parameter of an optical signal for switching, all falls within the protection scope of the present invention.

Based on an example of an architectural diagram of the optical switching system shown in FIG. 2, and referring to the foregoing detailed descriptions, the following describes in detail a method for performing, by the adaptive compensation control module 21, compensation control on an optical signal, and for the description of the adaptive compensation module 21 in the optical switching system, reference may be made to descriptions in the following embodiments.

Figure 4:
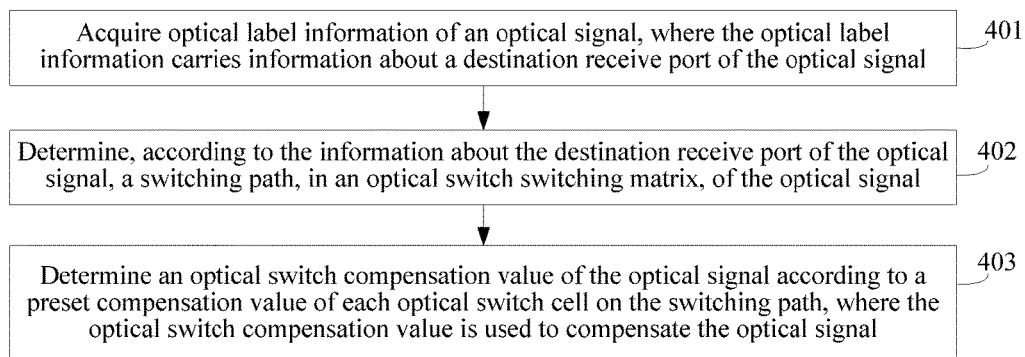
FIG. 4 is a schematic flowchart 1 of an adaptive compensation control method according to an embodiment of the present invention.

Specifically, an embodiment of the present invention provides an adaptive compensation control method. As shown in FIG. 4, the method includes the following.

401: Acquire optical label information of an optical signal, where the optical label information carries information about a destination receive port of the optical signal.

The optical signal is an optical signal that is from a different link and is transmitted to an optical switching system.

Specifically, based on the optical switching system shown in FIG. 2, after an optical signal of each fiber link is transmitted to the optical switching system, the optical signal of each link is split into two parts of optical signals by using an optical splitter, where it is assumed that an optical signal that is input to the adaptive compensation control module 21 is a first part of optical signal, and an optical signal that is input to the adaptive compensation module 22 is a second part of optical signal. Second parts of optical signals of N links are input to the adaptive compensation control module 21 for optical-to-electrical conversion to obtain electrical signals. The adaptive compensation module 21 reads, from the electrical signal of each link, optical label information of the optical signal of each link, where the optical label information of the optical signal of each link carries information about a packet length of the optical signal and information about a destination receive port of the optical signal. The information about the destination receive port is specifically a number of the destination receive port.

It should be noted that, in the optical switching system, the adaptive compensation control module 21 acquires, in parallel, the optical label information of the optical signals of all the links, and can quickly determine the optical label information of the optical signal of each link. In theory, the adaptive compensation control module 21 may also acquire, in serial, the optical signals, and whether to acquire, in parallel or in serial, the optical label information of the optical signals is not specifically limited in this embodiment of the present invention.

It should be noted that, the adaptive compensation control module 21 may also not perform optical-to-electrical conversion, and extract an all-optical label directly from the second part of optical signal, which is not specifically limited in this embodiment of the present invention.

The optical signal may be specifically an optical burst or may be an optical packet in the optical switching system.

402: Determine, according to the information about the destination receive port of the optical signal, a switching path, in an optical switch switching matrix, of the optical signal.

After the number of the destination receive port of the optical signal, that is, a number of a receive port of the optical switch switching matrix, is determined, after the optical signal of each link passes through the adaptive compensation module 22, the optical signal of each link is input to a corresponding transmit port of the optical switch switching matrix, and a number of the transmit port of the optical signal can be determined. Then, an optical switch switching path of the optical signal can be determined according to Table 1.

403: Determine an optical switch compensation value of the optical signal according to a preset compensation value of each optical switch cell on the switching path, where the optical switch compensation value is used to compensate the optical signal.

It should be noted that, each optical switch cell causes a specific insertion loss to the optical signal, and therefore a loss is caused to the optical signal after the optical signal is switched in a cut-through switching mode by the optical switch switching matrix 23. The optical switch compensation value is compensation for the loss caused to the signal by the optical switch switching matrix. An insertion loss parameter value of each optical switch cell has a property of time-invariance, and can remain unchanged for a long time once the insertion loss parameter value is obtained by means of measurement. After the insertion loss parameter value of each optical switch cell is obtained by means of measurement, the insertion loss value of each optical switch cell may be used as a preset compensation value of each optical switch cell.

It should be noted that, an insertion loss refers to a specific loss that is caused to a signal when an element or a device is inserted somewhere of a transmission system. That is, in the optical switch switching matrix, because an optical switch cell is inserted, a specific loss is caused to a power, a phase, and a polarization state of a signal that is switched in a cut-through switching mode.

It should be noted that, to reduce difficulty in measuring the insertion loss parameter value of the optical switch cell, a continuous-mode signal may be used as a measurement signal for measurement, and therefore a measurement method and a measurement tool may both also use a measurement method of a continuous mode, so that measurement of a burst signal is avoided. The measurement method of a continuous mode is a technology well known in the field, and therefore no further details are described in this embodiment of the present invention.

Based on Table 1, because optical switch cells included on each optical switch switching path are fixed, optical switch cells included on an optical switch switching path may be determined according to the switching path. Accordingly, an optical switch compensation value of the optical signal may be determined according to preset compensation values of the optical switch cells included on the switching path.

Certainly, Table 1 is intended to describe a correspondence between a switching path of the optical switch switching matrix and optical switch cells included on the switching path, but is not intended to limit the description. The adaptive compensation control module 21 may use another form to represent a switching path and optical switch cells included on the switching path, which is not specifically limited in this embodiment of the present invention.

Exemplarily, if a port number of a destination receive port of an optical signal of a link 1 is 2, and after being compensated by the adaptive compensation module, the optical signal of the link 1 is input to a transmit port 1, it may be determined that a switching path of the optical signal of the link 1 is a switching path 2, which includes an optical switch cell 1, an optical switch cell 2, an optical switch cell 7, and an optical switch cell 8. Then, a sum of preset compensation values of the foregoing four optical switch cells is calculated, and the sum of the preset compensation values of the four optical switch cells is used as an optical switch compensation value of the optical signal of the link 1.

Certainly, the preset compensation value may be at least one of the following: a preset power compensation value, a preset phase compensation value, and a preset polarization state compensation value.

Correspondingly, the optical switch compensation value may be at least one of the following: an optical switch power compensation value, an optical switch phase compensation value, and an optical switch polarization state compensation value.

After determining optical switch compensation values of the N links, the adaptive compensation control module 21 sends the optical switch compensation values of the optical signals of the N links to the adaptive compensation module 22, so that the adaptive compensation module 22 compensates the optical signals of the N links according to the optical switch compensation values of the optical signals of the N links.

Figure 5:
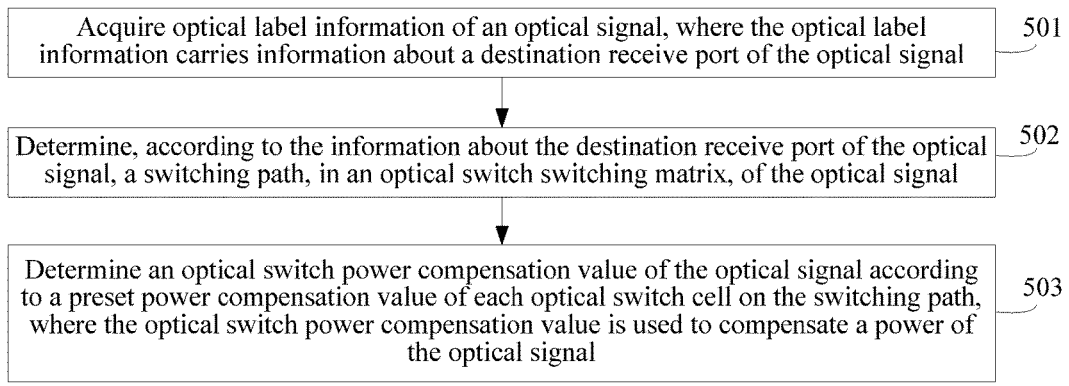
FIG. 5 is a schematic flowchart of a power compensation control method for an optical signal according to an embodiment of the present invention.

Specifically, in consideration of a power loss that is caused to the optical signal by the optical switch switching matrix 23, an embodiment of the present invention provides a power compensation control method for an optical signal, as shown in FIG. 5, specifically including the following.

- 501: Acquire optical label information of an optical signal, where the optical label information carries information about a destination receive port of the optical signal.
- 502: Determine, according to the information about the destination receive port of the optical signal, a switching path, in an optical switch switching matrix, of the optical signal.
- 503: Determine an optical switch power compensation value of the optical signal according to a preset power compensation value of each optical switch cell on the switching path, where the optical switch power compensation value is used to compensate a power of the optical signal.

Figure 6:
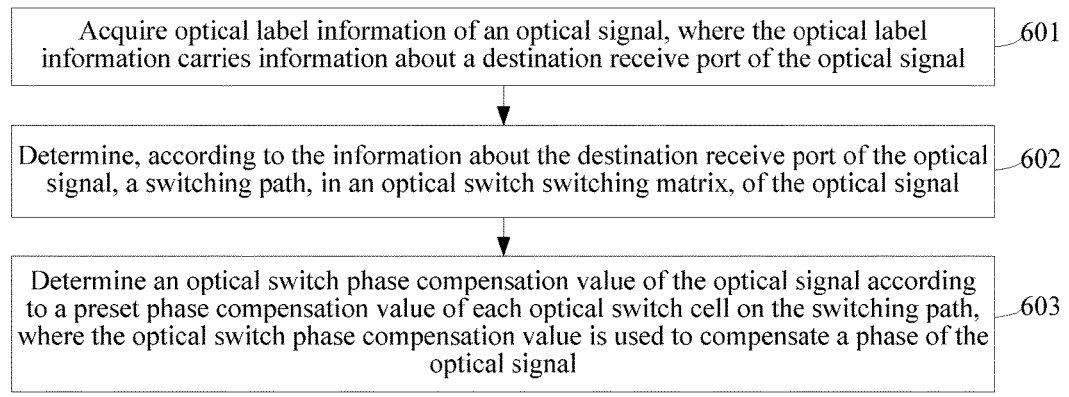
FIG. 6 is a schematic flowchart of a phase compensation control method for an optical signal according to an embodiment of the present invention.

Specifically, in a coherent system, after an optical signal is switched by the optical switch switching matrix 23, because performance of different optical switch cells is different, a phase of the optical signal changes, which causes a decoding error at a destination receive port. To improve decoding accuracy of a receive port of a switch and to reduce a bit error rate, a phase of an optical signal on each link may also be compensated. An embodiment of the present invention provides a phase compensation control method for an optical signal, as shown in FIG. 6, specifically including the following.

- 601: Acquire optical label information of an optical signal, where the optical label information carries information about a destination receive port of the optical signal.
- 602: Determine, according to the information about the destination receive port of the optical signal, a switching path, in an optical switch switching matrix, of the optical signal.
- 603: Determine an optical switch phase compensation value of the optical signal according to a preset phase compensation value of each optical switch cell on the switching path, where the optical switch phase compensation value is used to compensate a phase of the optical signal.

Specifically, in a polarization multiplexing system, after an optical signal is switched by the optical switch switching matrix 23, because performance of different optical switch cells is different, a polarization state of the optical signal changes, which causes a decoding error at a destination receive port. To improve decoding accuracy of a receive port of a switch and to reduce a bit error rate, a polarization state of an optical signal on each link may also be compensated. Specifically, the phase of each link may be compensated by using a phase-adjustable shifter array.

Figure 7:
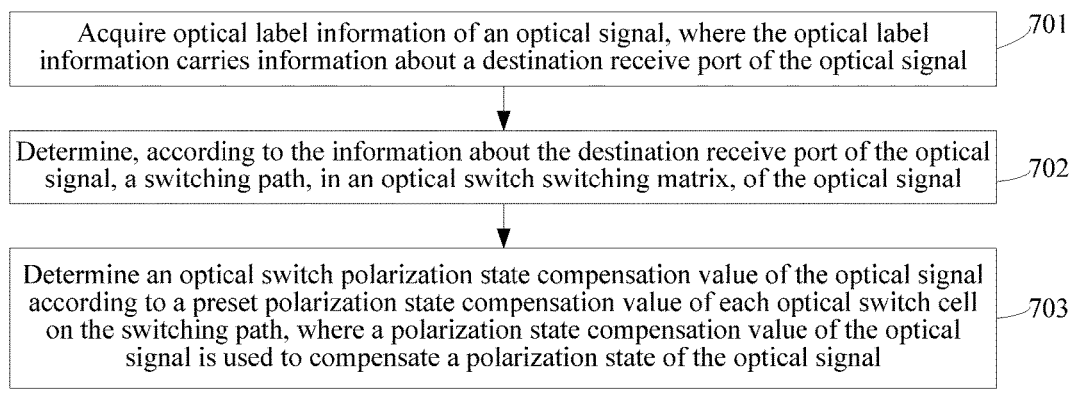
FIG. 7 is a schematic flowchart of a polarization state compensation control method for an optical signal according to an embodiment of the present invention.

An embodiment of the present invention provides a polarization state compensation control method for an optical signal, as shown in FIG. 7, specifically including the following.

- 701: Acquire optical label information of an optical signal, where the optical label information carries information about a destination receive port of the optical signal.
- 702: Determine, according to the information about the destination receive port of the optical signal, a switching path, in an optical switch switching matrix, of the optical signal.
- 703: Determine an optical switch polarization state compensation value of the optical signal according to a preset polarization state compensation value of each optical switch cell on the switching path, where a polarization state compensation value of the optical signal is used to compensate a polarization state of the optical signal.

The embodiments of the present invention provide an adaptive compensation control method. The method includes acquiring optical label information of an optical signal, where the optical label information carries information about a destination receive port of the optical signal; determining, according to the information about the destination receive port of the optical signal, a switching path, in an optical switch switching matrix, of the optical signal; and determining an optical switch compensation value of the optical signal according to a preset compensation value of each optical switch cell on the switching path, where the optical switch compensation value is used to compensate the optical signal. Based on the technical solution, because a switching path, in an optical switching matrix, of the optical signal may be determined according to information about a destination receive port of each link, and optical switch cells included on each switching path are fixed, a compensation value of the optical signal may be determined according to a preset compensation value of each optical switch cell on the optical switching path, and a compensation value of an optical packet does not need to be measured by using a feedback loop, which can quickly determine, before switching of an optical packet, a compensation value of the optical packet, so that after the optical packet is compensated according to the compensation value, an objective of optical signal equalization at a receive port of an optical switch is achieved.

Figure 8:
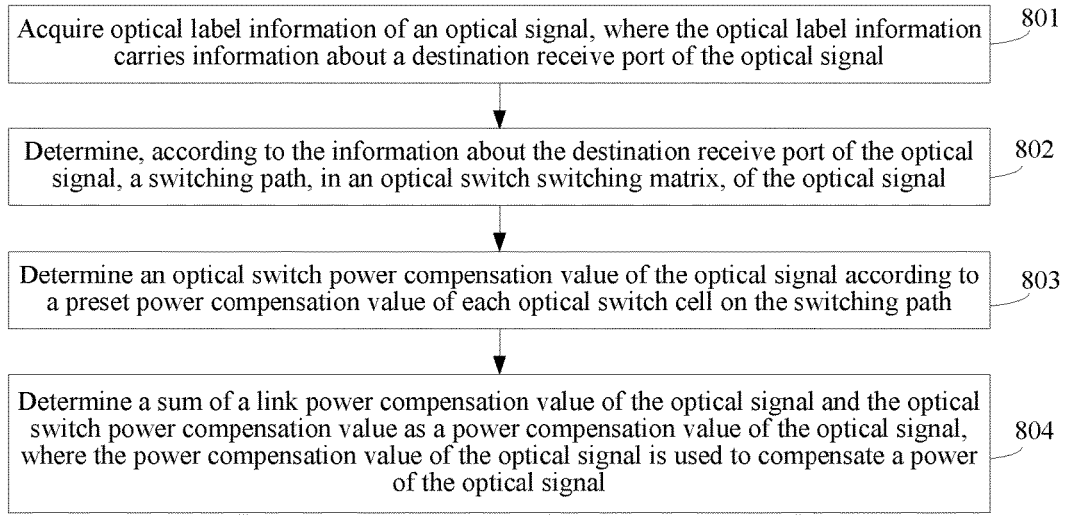
FIG. 8 is a schematic flowchart 2 of an adaptive compensation control method according to an embodiment of the present invention.

In consideration of power equalization at each receive port of an optical switch, when a power of an optical signal is compensated, a power loss on a link along which the optical signal is transmitted from an upper-level switching node or a user side to the optical switching system further needs to be considered. Based on this, an embodiment of the present invention provides an adaptive compensation control method. As shown in FIG. 8, the method includes the following.

- 801: Acquire optical label information of an optical signal, where the optical label information carries information about a destination receive port of the optical signal.
- 802: Determine, according to the information about the destination receive port of the optical signal, a switching path, in an optical switch switching matrix, of the optical signal.
- 803: Determine an optical switch power compensation value of the optical signal according to a preset power compensation value of each optical switch cell on the switching path.

Specifically, optical switch cells included in the switching path, in the optical switch switching matrix, of the optical signal are determined. The optical switch power compensation value of the optical signal may be determined according to the preset power compensation value of each optical switch cell on the switching path.

Based on a diagram of the optical switching system shown in FIG. 2, a power compensation value of each optical switch cell and optical switch cells included on each switching path are preset in the adaptive compensation control module 21. For example, the optical switch switching matrix uses a 4*4 switching matrix shown in FIG. 3. If a number of a destination receive port of an optical signal of a link 1 is 2, a number of a destination receive port of an optical signal of a link 2 is 4, a number of a destination receive port of an optical signal of a link 3 is 1, and a number of a destination receive port of an optical signal of a link 4 is 3, referring to Table 1, switching paths of the links 1-4 are 2, 8, 9, and 15 respectively. Optical switch cells respectively included on the four switching paths are:

the switching path 2: optical switch cells 1, 2, 7, and 8;
the switching path 8: optical switch cells 5, 17, 18, and 22;
the switching path 9: optical switch cells 13, 9, 10, and 4; and
the switching path 15: optical switch cells 19, 23, 21, and 16.

Optical switch power compensation values of the optical signals of the links 1-4 may be calculated according to a preset power compensation value of each optical switch cell.

804: Determine a sum of a link power compensation value of the optical signal and the optical switch power compensation value as a power compensation value of the optical signal, where the power compensation value of the optical signal is used to compensate a power of the optical signal.

It should be noted that, the link power compensation value is a compensation value for a loss that is caused to the optical signal on a link from an upper-level switching node or a user side to the optical switching system.

A link power compensation value of each link may be preset. It should be noted that, especially for a link with a short transmission distance and a relatively low rate, a transmission loss of the link may be considered to be fixed, and therefore, based on this, the link power compensation value of each link may be preset.

Certainly, the link power compensation value of each link may also be a compensation value that is obtained after a power, which is measured in real time, of an optical signal is compared with a target power of the optical signal.

A sum of the link power compensation value of each link and the optical switch compensation value may be used as the power compensation value of the optical signal.

It should be noted that, the adaptive compensation module 22 may perform, according to the power compensation value of the optical signal, power amplification compensation on the optical signal by using a power amplifier driver unit and an amplifier array.

Figure 9:
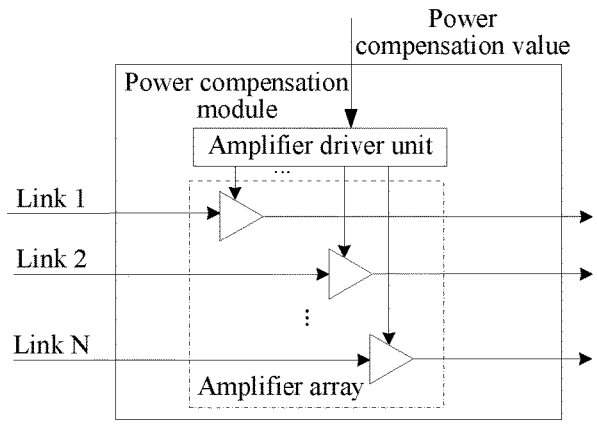
FIG. 9 is a schematic structural diagram of a power compensation module according to an embodiment of the present invention.

Specifically, as shown in FIG. 9, a power compensation module includes an amplifier driver unit and an amplifier array. The amplifier driver unit receives an instruction from the power compensation control module 21, and drives, by using the amplifier driver unit according to the power compensation value of the optical signal, an amplifier that is corresponding to each link and is in the amplifier array, to perform corresponding power amplification compensation on the optical signal.

The amplifier array may use a semiconductor optical amplifier (SOA), a burst-mode erbium-doped fiber amplifier (EDFA), or the like.

This embodiment of the present invention provides an adaptive compensation control method. The method includes acquiring optical label information of an optical signal, where the optical label information carries information about a destination receive port of the optical signal; determining, according to the information about the destination receive port of the optical signal, a switching path, in an optical switch switching matrix, of the optical signal; determining an optical switch power compensation value of the optical signal according to a preset power compensation value of each optical switch cell on the switching path; and determining a sum of a link power compensation value of the optical signal and the optical switch power compensation value as a power compensation value of the optical signal, where the power compensation value of the optical signal is used to compensate a power of the optical signal. Based on the technical solution, because a switching path, in an optical switching matrix, of the optical signal may be determined according to information about a destination receive port of each link, and optical switch cells included on each switching path are fixed, a compensation value of the optical signal may be determined according to a preset compensation value of each optical switch cell on the optical switching path, and a compensation value of an optical packet does not need to be measured by using a feedback loop, which can quickly determine, before switching of an optical packet, a compensation value of the optical packet, so that after the optical packet is compensated according to the compensation value, an objective of optical signal equalization at a receive port of an optical switch is achieved. In addition, a link loss is also considered, which can make compensation for an optical signal of each link more accurate.

To quickly compensate a power of an optical signal and to reduce system power consumption, in the method, optical-to-electrical conversion is performed on the optical signal to obtain an electrical signal, and the electrical signal is then split into two parts of electrical signals, where one part of electrical signal is used to extract optical label information, and the other part of electrical signal is used to measure the power of the optical signal.

Figure 10:
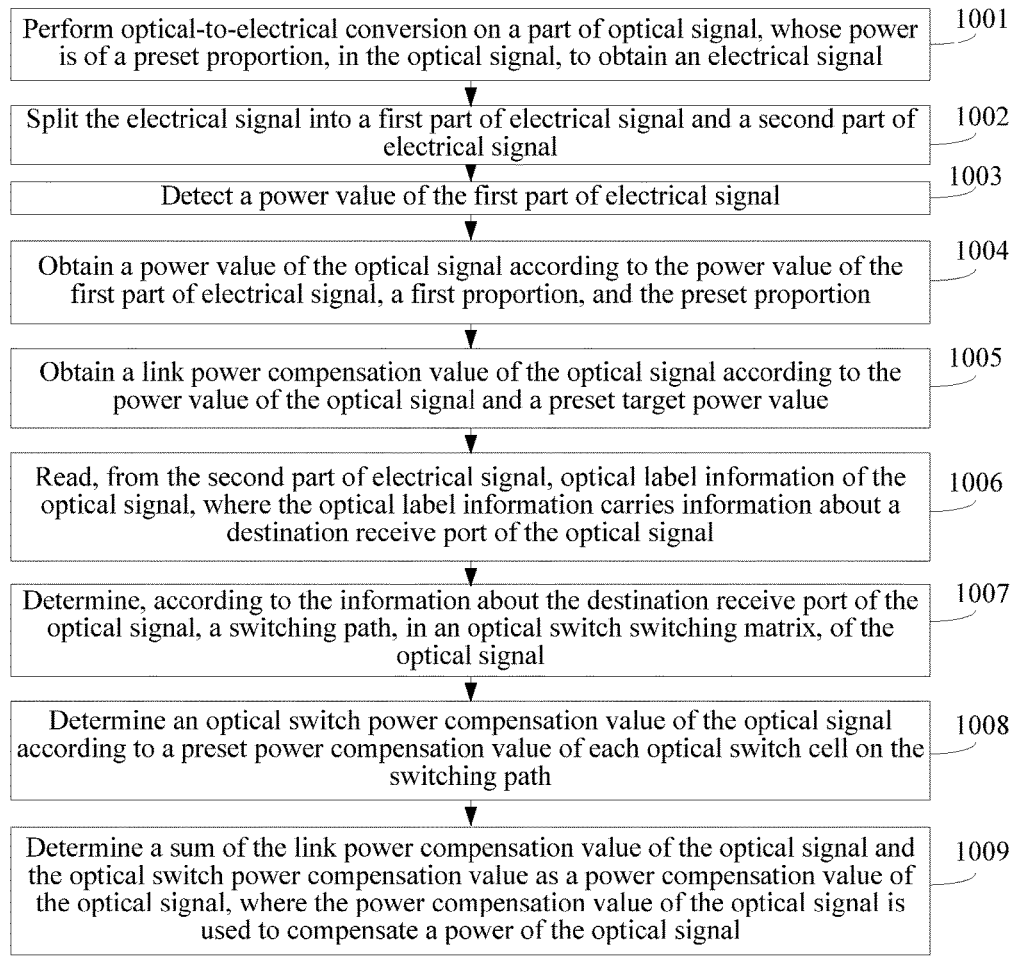
FIG. 10 is a schematic flowchart 3 of an adaptive compensation control method according to an embodiment of the present invention.

Specifically, an embodiment of the present invention provides an adaptive compensation control method. As shown in FIG. 10, the method includes the following.

1001: Perform optical-to-electrical conversion on a part of an optical signal, whose power is of a preset proportion, in the optical signal, to obtain an electrical signal.

Based on a diagram of the optical switching system shown in FIG. 2, an optical signal of each link is split into two parts of optical signals by using an optical splitter. A first part of optical signal is input to the adaptive compensation control module 21, and a second part of optical signal is input to the adaptive compensation module 22. The adaptive compensation module 22 compensates the optical signal and then sends the optical signal to an optical switch switching matrix for switching.

After optical-to-electrical conversion is performed on the first part of optical signal, an electrical signal of the first part of optical signal is obtained. A ratio of a power of the first part of optical signal to a power value of the optical signal is a preset proportion. A sum of power values of the first part of optical signal and the second part of optical signal is the power value of the optical signal.

1002: Split the electrical signal into a first part of electrical signal and a second part of electrical signal.

The first part of electrical signal occupies a first proportion of the electrical signal, and the second part of electrical signal occupies a second proportion of the electrical signal.

After the electrical signal of the first part of optical signal is obtained, the electrical signal of the first part of optical signal is split into two parts of electrical signals, where a first part of electrical signal of each link is used to determine a power value of an optical signal of each link, and a second part of electrical signal is used to determine optical label information of the optical signal of each link.

Specifically, an element or a device such as a power splitter may be used to split the electrical signal.

The first proportion and the second proportion may be any proportion of a power of the optical signal, and a sum of the first proportion and the second proportion is one hundred percent. For example, the first proportion may be 10%, and then the second proportion is 90%. Values of the first proportion and the second proportion are not specifically limited in this embodiment of the present invention.

1003: Detect a power value of the first part of electrical signal.

It should be noted that, a power value of the first part of electrical signal of each link may be obtained by detecting a current or a voltage of the first part of electrical signal.

1004: Obtain a power value of the optical signal according to the power value of the first part of electrical signal, the first proportion, and the preset proportion.

After the power value of the first part of electrical signal of each link is obtained by means of detection, the power value of the first part of electrical signal may be marked as A, the first proportion may be marked as B, and the preset proportion may be marked as F; and then the power value C of the optical signal may be calculated by using a formula (1):

$$C = A/(B*F) \quad (1)$$

For example, the power value A of the first part of electrical signal is 0.1 mW, the first proportion B is 10%, and the preset proportion F is 10%, and the power value C of the optical signal is 10 mW by means of calculation by using the formula (1).

1005: Obtain a link power compensation value of the optical signal according to the power value of the optical signal and a preset target power value.

After the power value C of the optical signal is obtained, the link power compensation value E of the optical signal may be calculated by using a formula (2):

$$E = D - C*(1-F) \quad (2)$$

The preset target power value of the optical signal is marked as D.

For example, the preset target power value D is 20 mW, and the link power compensation value is 11 mW by means of calculation by using the formula (2).

1006: Read, from the second part of electrical signal, optical label information of the optical signal, where the optical label information carries information about a destination receive port of the optical signal.

1007: Determine, according to the information about the destination receive port of the optical signal, a switching path, in an optical switch switching matrix, of the optical signal.

1008: Determine an optical switch power compensation value of the optical signal according to a preset power compensation value of each optical switch cell on the switching path.

It should be noted that, a process for acquiring the link power compensation value of the optical signal in steps 1003 to 1005 and a process for determining the optical switch power compensation value of the optical signal in steps 1006 and 1007 are not performed in sequence, and may be performed in parallel. Certainly, two processes for obtaining the link power compensation value and the optical switch power compensation value may also be executed in sequence, but the sequence is not limited, that is, the optical switch power compensation value may be obtained first, or the link power compensation value may be obtained first. In this embodiment of the present invention, it is intended to obtain the link power compensation value and the optical switch power compensation value, and an obtaining sequence is not specifically limited.

1009: Determine a sum of the link power compensation value of the optical signal and the optical switch power compensation value as a power compensation value of the optical signal, where the power compensation value of the optical signal is used to compensate a power of the optical signal.

For detailed descriptions of steps 1006 to 1009, reference may be made to descriptions of steps 801 to 804 in the foregoing embodiment, and no further details are described herein in this embodiment of the present invention.

It should be noted that, because when the optical label information is read and the power of the optical signal is measured, optical-to-electrical conversion needs to be performed on the optical signal, to reduce a system power and to improve system performance, optical-to-electrical conversion may be performed on the first part of optical signal once to obtain an electrical signal, and the electrical signal that is converted from the first part of optical signal of each link may be split into two parts of electrical signals by using a power splitter, that is, a first part of electrical signal and a second part of electrical signal, which are then used to read the optical label information and detect the power value respectively.

Certainly, on a premise that reducing a system power is not considered, the first part of optical signal of each link may also be split into two parts of optical signals by using an optical splitter, and then optical-to-electrical conversion is performed on the two parts of optical signals separately, so as to read the optical label information and to detect the power of the optical signal.

Based on the adaptive compensation control method provided in this embodiment of the present invention, because a switching path, in an optical switching matrix, of an optical signal may be determined according to information about a destination receive port of each link, and optical switch cells included in each switching path are fixed, a compensation value of the optical signal may be determined according to a preset compensation value of each optical switch cell on the optical switching path, and a compensation value of an optical packet does not need to be measured by using a feedback loop, which can quickly determine, before switching of an optical packet, a compensation value of the optical packet, so that after the optical packet is compensated according to the compensation value, an objective of optical signal equalization at a receive port of an optical switch is achieved. In addition, a link loss is also considered, which can make compensation for an optical signal of each link more accurate. Further, if before optical label information is extracted and a power of the optical signal is measured, optical-to-electrical conversion is performed only once, a system power can be reduced and system performance can be improved.

Figure 11:
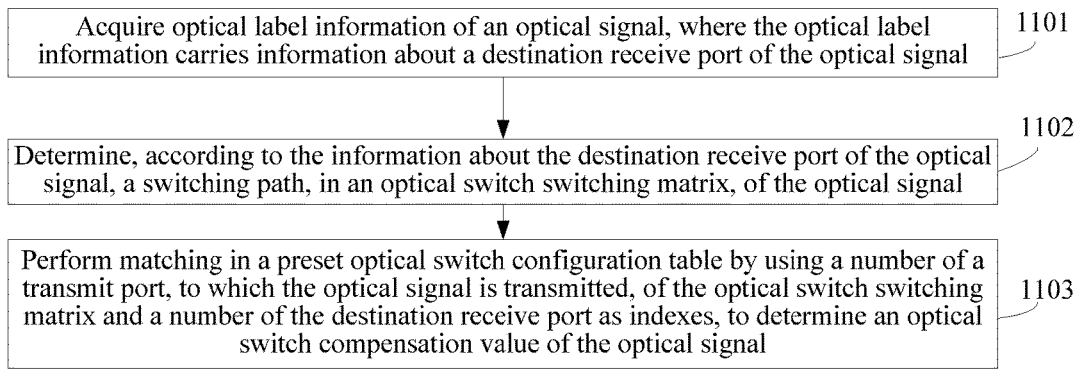
FIG. 11 is a schematic flowchart 4 of an adaptive compensation control method according to an embodiment of the present invention.

To quickly obtain the optical switch compensation value of the optical signal, the optical switch compensation value of the optical signal may be obtained by querying a preset optical switch configuration table according to a number of a transmit port, to which the optical signal is transmitted, of the optical switching matrix and a number of a destination receive port to which the optical signal is transmitted after cut-through switching by the optical switching matrix. Specifically, as shown in FIG. 11, an embodiment of the present invention provides an adaptive compensation control method, where the method includes the following.

1101: Acquire optical label information of an optical signal, where the optical label information carries information about a destination receive port of the optical signal.
  1102: Determine, according to the information about the destination receive port of the optical signal, a switching path, in an optical switch switching matrix, of the optical signal.
  1103: Perform matching in a preset optical switch configuration table by using a number of a transmit port, to which the optical signal is transmitted, of the optical switch switching matrix and a number of the destination receive port as indexes, to determine an optical switch compensation value of the optical signal.

The preset optical switch configuration table includes a one-to-one correspondence among a number of a transmit port of the optical switch switching matrix, a number of a destination receive port, and an optical switch compensation value.

Exemplarily, the 4*4-structure optical switch switching matrix 30 shown in FIG. 3 is used as an example, and the optical switch switching matrix 30 includes 24 optical switch cells, and a preset compensation value of each switching path may be determined according to a preset compensation value of each optical switch cell. Specifically, the preset optical switch configuration table may be shown as Table 2:

TABLE 2

| Number of transmit port | Number of receive port | Optical switch compensation value |
|---|---|---|
| 1 | 1 | A11 |
| 1 | 2 | A12 |
| 1 | 3 | A13 |
| 1 | 4 | A14 |
| 2 | 1 | A21 |
| 2 | 2 | A22 |
| 2 | 3 | A23 |
| 2 | 4 | A24 |
| 3 | 1 | A31 |
| 3 | 2 | A32 |
| 3 | 3 | A33 |
| 3 | 4 | A34 |
| 4 | 1 | A41 |
| 4 | 2 | A42 |
| 4 | 3 | A43 |
| 4 | 4 | A44 |

If a port number of a destination receive port of an optical signal of the link 1 is 1, a port number of a destination receive port of an optical signal of the link 2 is 2, a port number of a destination receive port of an optical signal of the link 3 is 3, and a port number of a destination receive port of an optical signal of the link 4 is 4, an optical switch compensation value is A11 when the link 1 is matched with the port number 1 of the destination receive port, an optical switch compensation value is A22 when the link 2 is matched with the port number 2 of the destination receive port, an optical switch compensation value is A33 when the link 3 is matched with the port number 3 of the destination receive port, and an optical switch compensation value is A44 when the link 4 is matched with the port number 4 of the destination receive port.

Optionally, the preset optical switch configuration table may also include: an index entry including a destination receive port that corresponds to each transmit port, and an optical switch compensation value of an optical signal at each receive port.

Exemplarily, the 4*4 optical switch switching matrix shown in FIG. 3 is used as an example, and a format of an index entry of the preset optical switch configuration table is:

| Destination receive port corresponding to a transmit port 1 | Destination receive port corresponding to a transmit port 2 | Destination receive port corresponding to a transmit port 3 | Destination receive port corresponding to a transmit port 4 |
|---|---|---|---|

The preset optical switch configuration table is shown as Table 3:

TABLE 3

| | Optical switch compensation value Transmit port | | | |
|---|---|---|---|---|
| Index entry | 1 | 2 | 3 | 4 |
| 1234 | A11 | A22 | A33 | A44 |
| 1243 | A11 | A22 | A34 | A43 |
| 1324 | A11 | A23 | A32 | A44 |
| 1342 | A11 | A23 | A34 | A42 |
| 1432 | A11 | A24 | A33 | A42 |
| 1423 | A11 | A24 | A32 | A43 |
| 2341 | A12 | A23 | A34 | A41 |
| 2314 | A12 | A23 | A31 | A44 |
| 2431 | A12 | A24 | A33 | A41 |
| 2413 | A12 | A24 | A31 | A43 |
| 2134 | A12 | A21 | A33 | A44 |
| 2143 | A12 | A21 | A34 | A43 |
| 3412 | A13 | A24 | A31 | A42 |
| 3421 | A13 | A24 | A32 | A41 |
| 3214 | A13 | A22 | A31 | A44 |
| 3241 | A13 | A22 | A34 | A41 |
| 3124 | A13 | A21 | A32 | A44 |
| 3142 | A13 | A21 | A34 | A42 |
| 4123 | A14 | A21 | A32 | A43 |
| 4132 | A14 | A21 | A33 | A42 |
| 4213 | A14 | A22 | A31 | A43 |
| 4231 | A14 | A22 | A33 | A41 |
| 4312 | A14 | A23 | A31 | A42 |
| 4321 | A14 | A23 | A32 | A41 |

For example, if a port of a destination receive port of the optical signal of the link 1 is 2, a port of a destination receive port of the optical signal of the link 2 is 3, a port of a destination receive port of the optical signal of the link 3 is 1, and a port of a destination receive port of the optical signal of the link 4 is 4, a generated index number is 2314. Searching is performed in Table 2 according to the index number to obtain that an optical switch compensation value of an optical signal that is switched in a cut-through switching mode from the transmit port 1 is A12, an optical switch compensation value of an optical signal that is switched in a cut-through switching mode from the transmit port 2 is A23, an optical switch compensation value of an optical signal that is switched in a cut-through switching mode from the transmit port 3 is A31, and an optical switch compensation value of an optical signal that is switched in a cut-through switching mode from the transmit port 4 is A44.

The optical switch compensation value may include at least one of: an optical switch power compensation value, an optical switch phase compensation value, and an optical switch polarization state compensation value.

For detailed descriptions of steps 1101 and 1102, reference may be made to descriptions of steps 401 to 402, and no further details are described herein in this embodiment of the present invention.

Based on the adaptive compensation control method provided in this embodiment of the present invention, because a switching path, in an optical switching matrix, of the optical signal may be determined according to information about a destination receive port of each link, and optical switch cells included on each switching path are fixed, a compensation value of the optical signal may be determined according to a preset compensation value of each optical switch cell on the optical switching path, and a compensation value of an optical packet does not need to be measured by using a feedback loop, which can quickly determine, before switching of an optical packet, a compensation value of the optical packet, so that after the optical packet is compensated according to the compensation value, an objective of optical signal equalization at a receive port of an optical switch is achieved. In addition, because an optical switch configuration table is preset in an adaptive compensation control module, an optical switch compensation value of an optical signal can be quickly found by means of query.

Figure 12:
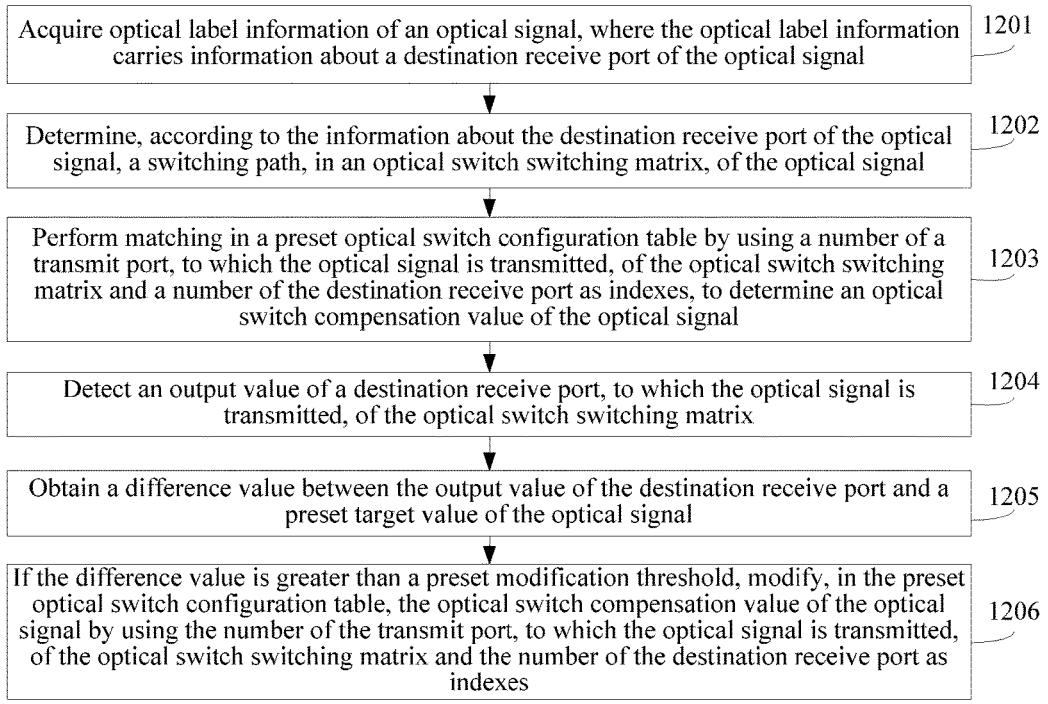
FIG. 12 is a schematic flowchart 5 of an adaptive compensation control method according to an embodiment of the present invention.

Due to reasons such as a temperature change and aging of an optical switch cell, an optical parameter of the optical switch cell changes. After an optical signal is switched by the optical switch cell, an insertion loss caused to the optical signal by the optical switch cell also changes. To compensate the optical signal accurately, the preset optical switch configuration table needs to be updated. Specifically, an embodiment of the present invention provides an adaptive compensation control method. As shown in FIG. 12, the method includes the following.

1201: Acquire optical label information of an optical signal, where the optical label information carries information about a destination receive port of the optical signal.

1202: Determine, according to the information about the destination receive port of the optical signal, a switching path, in an optical switch switching matrix, of the optical signal.

1203: Perform matching in a preset optical switch configuration table by using a number of a transmit port, to which the optical signal is transmitted, of the optical switch switching matrix and a number of the destination receive port as indexes, to determine an optical switch compensation value of the optical signal.

1204: Detect an output value of a destination receive port, to which the optical signal is transmitted, of the optical switch switching matrix.

The output value may specifically be at least one parameter of: a power, a phase, and a polarization state of the optical signal.

1205: Obtain a difference value between the output value of the destination receive port and a preset target value of the optical signal.

1206: If the difference value is greater than a preset modification threshold, modify, in the preset optical switch configuration table, the optical switch compensation value of the optical signal by using the number of the transmit port, to which the optical signal is transmitted, of the optical switch switching matrix and the number of the destination receive port as indexes.

For detailed descriptions of steps 1201 to 1203, reference may be made to descriptions of steps 401 to 403, and no further details are described herein in this embodiment of the present invention.

Exemplarily, the optical switch configuration table of Table 2 is used as an example for description, and the preset optical switch compensation value is a preset optical switch power compensation value. If a power of an optical signal output by a destination receive port 1 is 2 mW, a power of an optical signal output by a destination receive port 2 is 1.8 mW, a power of an optical signal output by a destination receive port 3 is 1.5 mW, and a power of an optical signal output by a port 4 is 1.4 mW. A port number of a destination receive port of an optical signal of the link 1 is 1, a port number of a destination receive port of an optical signal of the link 2 is 2, a port number of a destination receive port of an optical signal of the link 3 is 3, and a port number of a destination receive port of an optical signal of the link 4 is 4. If a preset target power value of the links 1-4 is 2 mW and the preset modification threshold is 0.4 mW, a difference value of the link 1 is 0 mW, a difference value of the link 2 is 0.2 mW, a difference value of the link 3 is 0.5 mW, and a difference value of the link 4 is 0.6 mW. The difference values of the link 3 and the link 4 are greater than the preset modification threshold, and then, an optical switch compensation value of the link 3 for the destination receive port 3 is modified to A33+0.5 mW, and an optical switch compensation value of the link 4 for a destination receive port 4 is modified to A44+0.6 mW.

Figure 13:
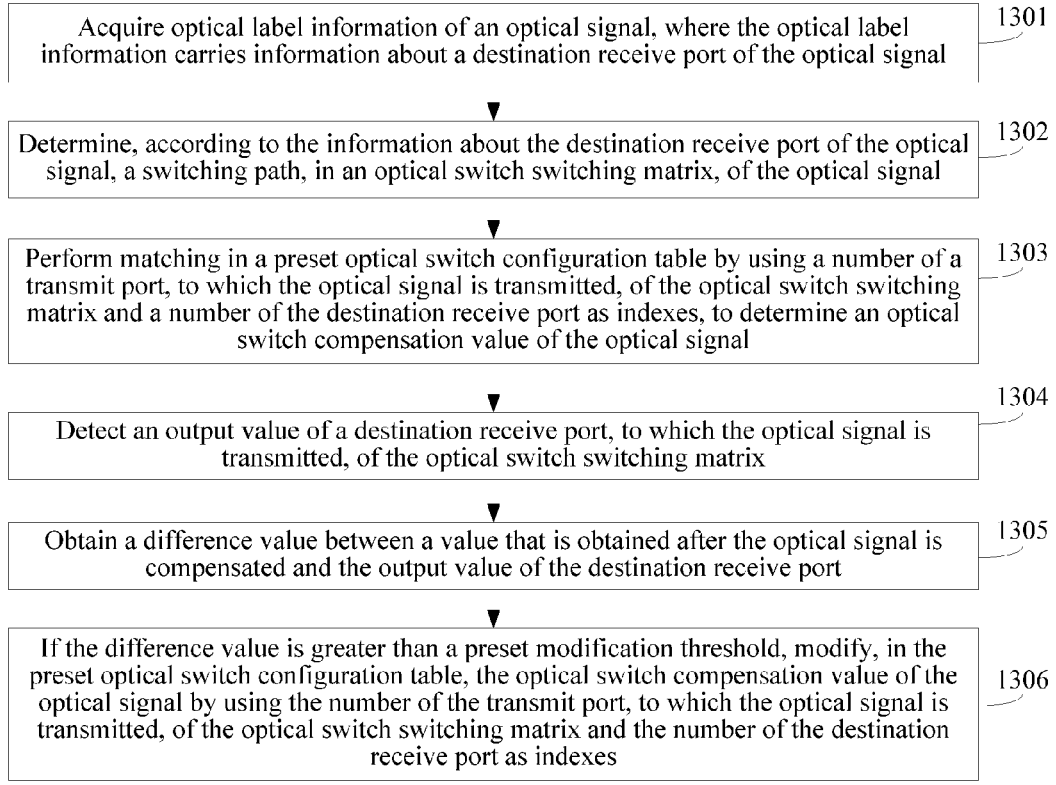
FIG. 13 is a schematic flowchart 6 of an adaptive compensation control method according to an embodiment of the present invention.

Based on the adaptive compensation control method provided in this embodiment of the present invention, because a switching path, in an optical switching matrix, of the optical signal may be determined according to information about a destination receive port of each link, and optical switch cells included on each switching path are fixed, a compensation value of the optical signal may be determined according to a preset compensation value of each optical switch cell on the optical switching path, and a compensation value of an optical packet does not need to be measured by using a feedback loop, which can quickly determine, before switching of an optical packet, a compensation value of the optical packet, so that after the optical packet is compensated according to the compensation value, an objective of optical signal equalization at a receive port of an optical switch is achieved. In addition, an optical switch configuration table can be updated in real time according to a change of performance of an optical switch cell, which further improves signal equalization at each receive port of an optical switch switching matrix Further, to update the preset optical switch configuration table more accurately, an output value that is obtained after the optical signal is compensated also needs to be detected, and the output value that is obtained after the compensation is compared with an output value of the optical signal at a destination receive port to determine whether to perform updating. An embodiment of the present invention provides an adaptive compensation control method. As shown in FIG. 13, the method includes the following.

1301: Acquire optical label information of an optical signal, where the optical label information carries information about a destination receive port of the optical signal.

1302: Determine, according to the information about the destination receive port of the optical signal, a switching path, in an optical switch switching matrix, of the optical signal.

1303: Perform matching in a preset optical switch configuration table by using a number of a transmit port, to which the optical signal is transmitted, of the optical switch switching matrix and a number of the destination receive port as indexes, to determine an optical switch compensation value of the optical signal.

1304: Detect a value that is obtained after the optical signal is compensated and an output value of a destination receive port, to which the optical signal is transmitted, of the optical switch switching matrix.

It should be noted that, referring to the optical switching system shown in FIG. 2, the value that is obtained after the optical signal is compensated is specifically an output value that is obtained after the adaptive compensation module 22 compensates the optical signal according to a compensation value, sent by the adaptive compensation control module, of the optical signal.

Specifically, the value that is obtained after the optical signal is compensated may be at least one of: a power, a phase, and a polarization state.

1305: Obtain a difference value between the value that is obtained after the optical signal is compensated and the output value of the destination receive port.

1306: If the difference value is greater than a preset modification threshold, modify, in the preset optical switch configuration table, the optical switch compensation value of the optical signal by using the number of the transmit port, to which the optical signal is transmitted, of the optical switch switching matrix and the number of the destination receive port as indexes.

For detailed descriptions of steps 1301 to 1303, reference may be made to descriptions of steps 401 to 403, and no further details are described herein in this embodiment of the present invention.

Exemplarily, the optical switch configuration table of Table 2 is used as an example for description, and the preset optical switch compensation value is a preset optical switch power compensation value. If a power of an optical signal output by a destination receive port 1 is 2 mW, a power of an optical signal output by a destination receive port 2 is 1.8 mW, a power of an optical signal output by a destination receive port 3 is 1.5 mW, and a power of an optical signal output by a port 4 is 1.4 mW. A power value that is obtained after an optical signal of a link 1 is compensated is 2.4 mW, a power value that is obtained after an optical signal of a link 2 is compensated is 2.4 mW, a power value that is obtained after an optical signal of a link 3 is compensated is 2.4 mW, and a power value that is obtained after an optical signal of a link 4 is compensated is 2.4 mW, where a port number of a destination receive port of the optical signal of the link 1 is 1, a port number of a destination receive port of the optical signal of the link 2 is 2, a port number of a destination receive port of the optical signal of the link 3 is 3, and a port number of a destination receive port of the optical signal of the link 4 is 4. If the preset modification threshold is 0.6 mW, a difference value of the link 1 is 0.4 mW, a difference value of the link 2 is 0.6 mW, a difference value of the link 3 is 0.9 mW, and a difference value of the link 4 is 1 mW. The difference values of the link 3 and the link 4 are greater than the preset modification threshold, and then, an optical switch compensation value of the link 3 for the destination receive port 3 is modified to A33+0.9 mW, and an optical switch compensation value of the link 4 for the destination receive port 4 is modified to A44+1 mW.

Figure 14:
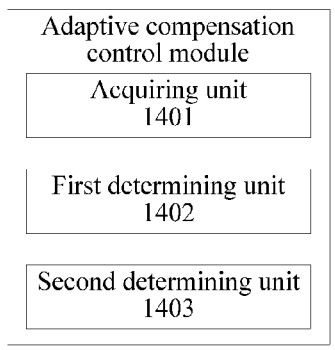
FIG. 14 is a schematic structural diagram 2 of an adaptive compensation control module according to an embodiment of the present invention.

Based on the adaptive compensation control method provided in this embodiment of the present invention, because a switching path, in an optical switching matrix, of the optical signal may be determined according to information about a destination receive port of each link, and optical switch cells included on each switching path are fixed, a compensation value of the optical signal may be determined according to a preset compensation value of each optical switch cell on the optical switching path, and a compensation value of an optical packet does not need to be measured by using a feedback loop, which can quickly determine, before switching of an optical packet, a compensation value of the optical packet, so that after the optical packet is compensated according to the compensation value, an objective of optical signal equalization at a receive port of an optical switch is achieved. In addition, an optical switch configuration table can be updated in real time according to a change of performance of an optical switch cell, which further improves signal equalization at each receive port of an optical switch switching matrix An embodiment of the present invention provides an adaptive compensation control module, where the adaptive compensation control module is applicable to the optical switching system shown in FIG. 2. As shown in FIG. 14, the module includes an acquiring unit 1401, a first determining unit 1402, and a second determining unit 1403.

The acquiring unit 1401 is configured to acquire optical label information of an optical signal, where the optical label information carries information about a destination receive port of the optical signal.

Specifically, the acquiring unit 1401 may read, from an electrical signal converted from the optical signal, the optical label information of the optical signal. The acquiring unit 1401 may also extract an all-optical label directly from a second part of optical signal. This is not specifically limited in this embodiment of the present invention.

Optical label information, read by the acquiring unit 1401, of an optical signal of each link carries information about a packet length of the optical signal and information about a destination receive port of the optical signal. The information about the destination receive port is specifically a number of the destination receive port.

It should be noted that, the acquiring unit 1401 acquires, in parallel, optical label information of optical signals of all links, and can quickly determine the optical label information of the optical signal of each link. In theory, the acquiring unit 1401 may also acquire, in serial, the optical signals, and whether to acquire, in parallel or in serial, the optical label information of the optical signals is not specifically limited in this embodiment of the present invention.

The optical signal may be specifically an optical burst or may be an optical packet in the optical switching system.

The optical signal is an optical signal that is from a different link and is transmitted to an optical switching system.

The first determining unit 1402 is configured to determine, according to the information about the destination receive port of the optical signal, a switching path, in an optical switch switching matrix, of the optical signal.

After the first determining unit 1402 determines the number of the destination receive port of the optical signal, that is, a number of a receive port of the optical switch switching matrix, after the optical signal of each link passes through the adaptive compensation module 22, the optical signal of each link is input to a corresponding transmit port of the optical switch switching matrix, and a number of the transmit port of the optical signal can be determined. Then, an optical switch switching path of the optical signal can be determined according to Table 1.

The second determining unit 1403 is configured to determine an optical switch compensation value of the optical signal according to a preset compensation value of each optical switch cell on the switching path, where the optical switch compensation value is used to compensate the optical signal.

It should be noted that, each optical switch cell causes a specific insertion loss to the optical signal, and therefore a loss is caused to the optical signal after the optical signal is switched in a cut-through switching mode by the optical switch switching matrix 23. The optical switch compensation value is compensation for the loss caused to the signal by the optical switch switching matrix. An insertion loss parameter value of each optical switch has a property of time-invariance, and can remain unchanged for a long time once the insertion loss parameter value is obtained by means of measurement. After the insertion loss parameter value of each optical switch cell is obtained by means of measurement, the insertion loss value of each optical switch cell may be used as a preset compensation value of each optical switch cell.

It should be noted that, an insertion loss refers to a specific loss that is caused to a signal when an element or a device is inserted somewhere of a transmission system. That is, in the optical switch switching matrix, because an optical switch cell is inserted, a specific loss is caused to a power, a phase, and a polarization state of a signal that is switched in a cut-through switching mode.

It should be noted that, to reduce difficulty in measuring the insertion loss parameter value of the optical switch cell, a continuous-mode signal may be used as a measurement signal for measurement, and therefore a measurement method and a measurement tool may both also use a measurement method of a continuous mode, so that measurement of a burst signal is avoided. The measurement method of a continuous mode is a technology well known in the field, and therefore no further details are described in this embodiment of the present invention.

Based on Table 1, because optical switch cells included on each optical switch switching path are fixed, the second determining unit 1403 may determine, according to an optical switch switching path, optical switch cells included on the switching path. Accordingly, the second determining unit 1403 may determine, according to preset compensation values of the optical switch cells included on the switching path, an optical switch compensation value of the optical signal.

Certainly, Table 1 is intended to describe a correspondence between a switching path of the optical switch switching matrix and optical switch cells included on the switching path, but is not intended to limit the description. Another form may also be used to represent a switching path and optical switch cells included on the switching path, which is not specifically limited in this embodiment of the present invention.

Certainly, the preset compensation value may be at least one of the following: a preset power compensation value, a preset phase compensation value, and a preset polarization state compensation value.

Correspondingly, the optical switch compensation value may be at least one of the following: an optical switch power compensation value, an optical switch phase compensation value, and an optical switch polarization state compensation value.

Specifically, in consideration of a power loss that is caused to the optical signal by the optical switch switching matrix 23, the preset compensation value of each optical switch cell may include a preset power compensation value of each optical switch cell, and the optical switch compensation value includes an optical switch power compensation value.

The second determining unit 1403 is specifically configured to determine the optical switch power compensation value of the optical signal according to the preset power compensation value of each optical switch cell on the switching path.

Specifically, in a coherent system, after an optical signal is switched by the optical switch switching matrix 23, because performance of different optical switch cells is different, a phase of the optical signal changes, which causes a decoding error at a destination receive port. To improve decoding accuracy of a receive port of a switch and to reduce a bit error rate, a phase of an optical signal on each link may also be compensated. Optionally, the preset compensation value of each optical switch cell is a preset phase compensation value of each optical switch cell, and the optical switch compensation value is an optical switch phase compensation value.

The second determining unit 1403 is specifically configured to determine the optical switch phase compensation value of the optical signal according to the preset phase compensation value of each optical switch cell on the switching path, where a phase compensation value of the optical signal is used to compensate a phase of the optical signal.

Specifically, in a polarization multiplexing system, after an optical signal is switched by the optical switch switching matrix 23, because performance of different optical switch cells is different, a polarization state of the optical signal changes, which causes a decoding error at a destination receive port. To improve decoding accuracy of a receive port of a switch and to reduce a bit error rate, a polarization state of an optical signal on each link may also be compensated. Optionally, the preset compensation value of each optical switch cell is a preset polarization state compensation value of each optical switch cell, and the optical switch compensation value is an optical switch polarization state compensation value.

The second determining unit 1403 is specifically configured to determine the optical switch polarization state compensation value of the optical signal according to the preset polarization state compensation value of each optical switch cell on the switching path, where a polarization state compensation value of the optical signal is used to compensate a polarization state of the optical signal.

Figure 15:
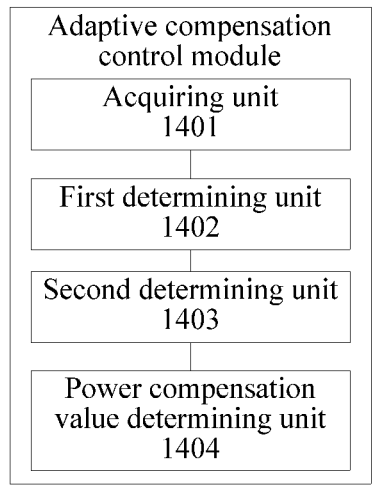
FIG. 15 is a schematic structural diagram 3 of an adaptive compensation control module according to an embodiment of the present invention.

In consideration of power equalization at each receive port of an optical switch, when a power of an optical signal is compensated, a power loss on a link along which the optical signal is transmitted from an upper-level switching node or a user side to the optical switching system further needs to be considered. Specifically, as shown in FIG. 15, the module further includes a power compensation value determining unit 1404.

The second determining unit 1403 is specifically configured to determine the optical switch power compensation value of the optical signal according to the preset power compensation value of each optical switch cell on the switching path.

The power compensation value determining unit 1404 is configured to determine a sum of a link power compensation value of the optical signal and the optical switch power compensation value as a power compensation value of the optical signal, where the power compensation value of the optical signal is used to compensate a power of the optical signal.

Figure 16:
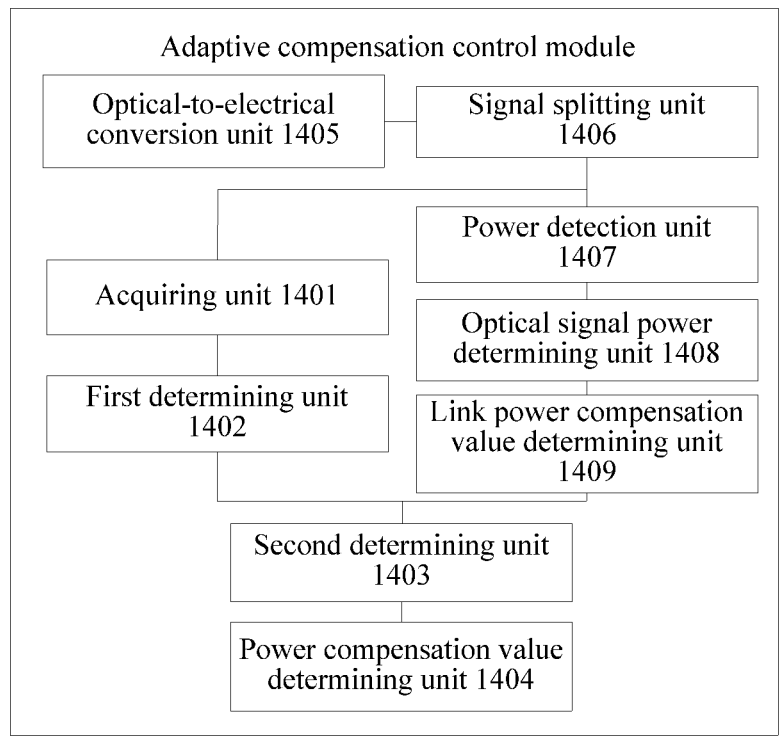
FIG. 16 is a schematic structural diagram 4 of an adaptive compensation control module according to an embodiment of the present invention.

To quickly compensate a power of an optical signal and to reduce system power consumption, in the method, optical-to-electrical conversion is performed first on the optical signal to obtain an electrical signal, and the electrical signal is then split into two parts of electrical signals, where one part of electrical signal is used to extract optical label information, and the other part of electrical signal is used to measure the power of the optical signal. Specifically, as shown in FIG. 16, the module further includes an optical-to-electrical conversion unit 1405, a signal splitting unit 1406, a power detection unit 1407, an optical signal power determining unit 1408, and a link power compensation value determining unit 1409.

The optical-to-electrical conversion unit 1405 is configured to perform optical-to-electrical conversion on a part of the optical signal, whose power is of a preset proportion, in the optical signal, to obtain an electrical signal.

The signal splitting unit 1406 is configured to split the electrical signal into a first part of electrical signal and a second part of electrical signal, where the first part of electrical signal occupies a first proportion of the electrical signal, and the second part of electrical signal occupies a second proportion of the electrical signal.

The power detection unit 1407 is configured to detect a power value of the first part of electrical signal.

The optical signal power determining unit 1408 is configured to obtain a power value of the optical signal according to a power value of a first part of electrical signal of each link, the first proportion, and the preset proportion.

The link power compensation value determining unit 1409 is configured to obtain the link power compensation value of the optical signal according to the power value of the optical signal and a preset target power value.

The acquiring unit 1401 is specifically configured to read, from the second part of electrical signal, the optical label information of the optical signal.

To quickly obtain the optical switch compensation value of the optical signal, the optical switch compensation value of the optical signal may be obtained by querying a preset optical switch configuration table according to a number of a transmit port, to which the optical signal is transmitted, of the optical switching matrix and a number of a destination receive port to which the optical signal is transmitted after cut-through switching by the optical switching matrix. Specifically, the information about the destination receive port includes a number of the destination receive port.

The second determining unit 1403 is specifically configured to perform matching in a preset optical switch configuration table by using a number of a transmit port, to which the optical signal is transmitted, of the optical switch switching matrix and the number of the destination receive port as indexes, to determine the optical switch compensation value of the optical signal.

The preset optical switch configuration table includes a one-to-one correspondence between a number of a transmit port of the optical switch switching matrix, a number of a destination receive port, and an optical switch compensation value.

Figure 17:
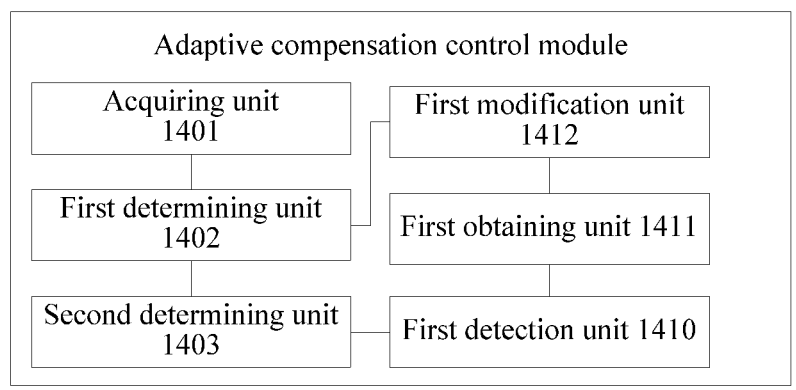
FIG. 17 is a schematic structural diagram 5 of an adaptive compensation control module according to an embodiment of the present invention.

Due to reasons such as a temperature change and aging of an optical switch cell, an optical parameter of the optical switch changes. After an optical signal is switched by the optical switch, an insertion loss caused to the optical signal by the optical switch also changes. To compensate the optical signal accurately, the preset optical switch configuration table needs to be updated. Specifically, as shown in FIG. 17, the module further includes a first detection unit 1410, a first obtaining unit 1411, and a first modification unit 1412.

The first detection unit 1410 is configured to detect an output value of a destination receive port, to which the optical signal is transmitted, of the optical switch switching matrix.

The first obtaining unit 1411 is configured to obtain a difference value between the output value of the destination receive port and a preset target value of the optical signal.

The first modification unit 1412 is configured to: if the difference value is greater than a preset modification threshold, modify, in the preset optical switch configuration table, the optical switch compensation value of the optical signal by using the number of the transmit port, to which the optical signal is transmitted, of the optical switch switching matrix and the number of the destination receive port as indexes.

Figure 18:
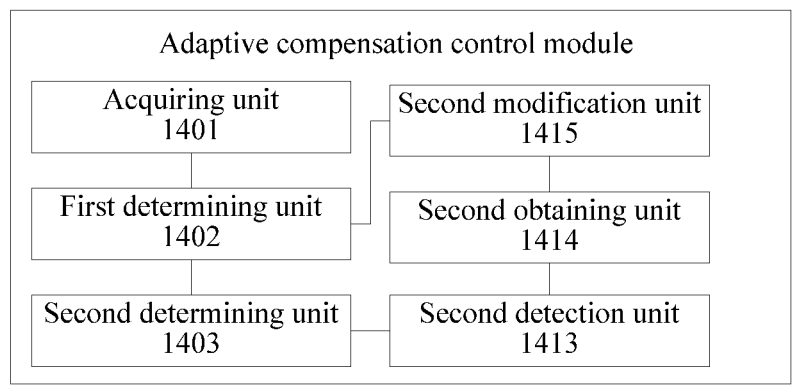
FIG. 18 is a schematic structural diagram 6 of an adaptive compensation control module according to an embodiment of the present invention.

Further, to update the preset optical switch configuration table more accurately, an output value that is obtained after the optical signal is compensated also needs to be detected, and the output value that is obtained after the compensation is compared with an output value of the optical signal at a destination receive port to determine whether to perform updating. Optionally, as shown in FIG. 18, the module further includes a second detection unit 1413, a second obtaining unit 1414, and a second modification unit 1415.

The second detection unit 1413 is configured to detect a value that is obtained after the optical signal is compensated and an output value of a destination receive port, to which the optical signal is transmitted, of the optical switch switching matrix.

The second obtaining unit 1414 is configured to obtain a difference value between the value that is obtained after the optical signal is compensated and the output value of the destination receive port.

The second modification unit 1415 is configured to: if the difference value is greater than a preset modification threshold, modify, in the preset optical switch configuration table, the optical switch compensation value of the optical signal by using the number of the transmit port, to which the optical signal is transmitted, of the optical switch switching matrix and the number of the destination receive port as indexes.

Specifically, for detailed descriptions of the adaptive compensation control module, reference may be made to descriptions of the embodiments of the adaptive compensation control method, and no further details are described herein in this embodiment of the present invention.

This embodiment of the present invention provides an adaptive compensation control module, where the module includes an acquiring unit, a first determining unit, and a second determining unit. The acquiring unit of the module acquires optical label information of an optical signal, where the optical label information carries information about a destination receive port of the optical signal. The first determining unit determines, according to the information about the destination receive port of the optical signal, a switching path, in an optical switch switching matrix, of the optical signal, and the second determining unit determines an optical switch compensation value of the optical signal according to a preset compensation value of each optical switch cell on the switching path, where the optical switch compensation value is used to compensate the optical signal. Based on the technical solution, because a switching path, in an optical switching matrix, of the optical signal may be determined according to information about a destination receive port of each link, and optical switch cells included on each switching path are fixed, a compensation value of the optical signal may be determined according to a preset compensation value of each optical switch cell on the optical switching path, and a compensation value of an optical packet does not need to be measured by using a feedback loop, which can quickly determine, before switching of an optical packet, a compensation value of the optical packet, so that after the optical packet is compensated according to the compensation value, an objective of optical signal equalization at a receive port of an optical switch is achieved.

According to the foregoing descriptions of the embodiments, a person skilled in the art may clearly understand that, for the purpose of convenient and brief description, division of the foregoing functional modules is used as an example for illustration. In an actual application, the foregoing functions can be allocated to different functional modules for implementation according to a requirement, that is, an inner structure of an apparatus is divided into different functional modules to implement all or some of the functions described above. For a detailed working process of the foregoing system, apparatus, and unit, reference may be made to a corresponding process in the foregoing method embodiments, and no further details are described herein.

In the several embodiments provided in the present application, it should be understood that the disclosed system, apparatus, and method may be implemented in other manners. For example, the described apparatus embodiment is merely exemplary. For example, the module or unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple nodes. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in a form of a software product. The computer software product is stored in a storage medium and includes several instructions for instructing a computer device (which may be a personal computer, a server, or a network device) or a processor to perform all or a part of the steps of the methods described in the embodiments of the present invention. The foregoing storage medium includes any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An adaptive compensation control method, comprising:
   acquiring optical label information of an optical signal, wherein the optical label information carries information about a destination receive port of the optical signal, wherein the information about the destination receive port comprises a number of the destination receive port;
   performing matching in a preset optical switch configuration table by using a number of a transmit port, to which the optical signal is transmitted, of an optical switch switching matrix and the number of the destination receive port as indexes, to determine a optical switch compensation value of the optical signal; and
   wherein the optical switch compensation value is used to compensate the optical signal, the preset optical switch configuration table comprises a one-to-one correspondence among the number of the transmit port of the optical switch switching matrix, the number of the destination receive port, and the optical switch compensation value.

2. The method according to claim 1, wherein the optical switch compensation value is an optical switch phase compensation value.

3. The method according to claim 1, wherein the optical switch compensation value is an optical switch polarization state compensation value.

4. The method according to claim 1, wherein the method further comprises:
   detecting an output value of a destination receive port, to which the optical signal is transmitted, of the optical switch switching matrix;
   obtaining a difference value between the output value of the destination receive port and a preset target value of the optical signal; and
   modifying, in the preset optical switch configuration table, and in response to the difference value being greater than a preset modification threshold, the optical switch compensation value of the optical signal by using the number of the transmit port, to which the optical signal is transmitted, of the optical switch switching matrix and the number of the destination receive port as indexes.

5. The method according to claim 1, wherein the method further comprises:
   detecting a value that is obtained after the optical signal is compensated and an output value of a destination receive port, to which the optical signal is transmitted, of the optical switch switching matrix;
   obtaining a difference value between the value that is obtained after the optical signal is compensated and the output value of the destination receive port; and
   modifying, in the preset optical switch configuration table and in response to the difference value being greater than a preset modification threshold, the optical switch compensation value of the optical signal by using the number of the transmit port, to which the optical signal is transmitted, of the optical switch switching matrix and the number of the destination receive port as indexes.

6. An adaptive compensation control module, wherein the module comprises:
a processor; and
a non-transitory computer-readable storage medium storing a program to be executed by the processor, the program including instructions to:
acquire optical label information of an optical signal, wherein the optical label information carries information about a destination receive port of the optical signal, wherein the information about the destination receive port comprises a number of the destination receive port;
performing matching in a preset optical switch configuration table by using a number of a transmit port, to which the optical signal is transmitted, of an optical switch switching matrix and the number of the destination receive port as indexes, to determine the optical switch compensation value of the optical signal; and
wherein the optical switch compensation value is used to compensate the optical signal, the preset optical switch configuration table comprises a one-to-one correspondence among the number of the transmit port of the optical switch switching matrix, the number of the destination receive port, and the optical switch compensation value.

7. The adaptive compensation control module according to claim 6, wherein the optical switch compensation value is an optical switch phase compensation value.

8. The adaptive compensation control module according to claim 6, wherein the optical switch compensation value is an optical switch polarization state compensation value.

9. The adaptive compensation control module according to claim 6, further comprising a first detector configured to detect an output value of a destination receive port, to which the optical signal is transmitted, of the optical switch switching matrix; and
wherein the program further includes instructions to:
obtain a difference value between the output value of the destination receive port and a preset target value of the optical signal; and
modify, in the preset optical switch configuration table, and in response to the difference value being greater than a preset modification threshold, the optical switch compensation value of the optical signal by using the number of the transmit port, to which the optical signal is transmitted, of the optical switch switching matrix and the number of the destination receive port as indexes.

10. The adaptive compensation control module according to claim 6, further comprising a second detector configured to detect a value that is obtained after the optical signal is compensated and an output value of a destination receive port, to which the optical signal is transmitted, of the optical switch switching matrix; and
wherein the program further includes instructions to:
obtain a difference value between the value that is obtained after the optical signal is compensated and the output value of the destination receive port; and
modify, in the preset optical switch configuration table, and in response to the difference value being greater than a preset modification threshold, the optical switch compensation value of the optical signal by using the number of the transmit port, to which the optical signal is transmitted, of the optical switch switching matrix and the number of the destination receive port as indexes.

11. The method according to claim 1, wherein the optical switch compensation value is an optical switch power compensation value.

12. The method according to claim 11, wherein the method further comprises, performing, before the acquiring the optical label information of the optical signal:
performing optical-to-electrical conversion on a part of the optical signal, whose power is of a preset proportion (F), in the optical signal, to obtain an electrical signal;
splitting the electrical signal into a first part of electrical signal and a second part of electrical signal, wherein the first part of electrical signal occupies a first proportion (B) of the electrical signal, and the second part of electrical signal occupies a second proportion of the electrical signal;
detecting a power value (A) of the first part of electrical signal;
obtaining a power value (C) of the optical signal according to the power value (A) of the first part of electrical signal, the first proportion (B), and the preset proportion (F), wherein $C=A/(B\times F)$; and
obtaining the link power compensation value (E) of the optical signal according to the power value (C) of the optical signal and a preset target power value (D), wherein $E=D-C\times(1-F)$.

13. The adaptive compensation control module according to claim 6, wherein the optical switch compensation value is an optical switch power compensation value.

14. The adaptive compensation control module according to claim 11, wherein the program further includes instructions to, before the acquiring optical label information of the optical signal:
perform optical-to-electrical conversion on a part of the optical signal, whose power is of a preset proportion (F), in the optical signal, to obtain an electrical signal;
split the electrical signal into a first part of electrical signal and a second part of electrical signal, wherein the first part of electrical signal occupies a first proportion (B) of the electrical signal, and the second part of electrical signal occupies a second proportion of the electrical signal;
detect a power value (A) of the first part of electrical signal;
obtain a power value (C) of the optical signal according to the power value (A) of the first part of electrical signal, the first proportion (B), and the preset proportion (F), wherein $C=A/(B\times F)$; and
obtain the link power compensation value (E) of the optical signal according to the power value (C) of the optical signal and a preset target power value (D), wherein $E=D-C\times(1-F)$.

15. An optical switching system, wherein the optical switching system comprises:
an optical switch switching matrix;
a first processor; and
a second processor,
wherein the first processor is configured to:
acquire optical label information of an optical signal, wherein the optical label information carries information about a destination receive port of the optical signal, wherein the information about the destination receive port comprises a number of the destination receive port;

perform matching in a preset optical switch configuration table by using a number of a transmit port, to which the optical signal is transmitted, of the optical switch switching matrix and the number of the destination receive port as indexes, to determine an optical switch compensation value of the optical signal, and wherein the optical switch compensation value is used to compensate the optical signal, the preset optical switch configuration table comprises a one-to-one correspondence among the number of the transmit port of the optical switch switching matrix, the number of the destination receive port, and the optical switch compensation value; and send the optical switch compensation value of the optical signal to the second processor;

wherein the second processor is configured to receive the optical switch compensation value, sent by the first processor, of the optical signal; and compensate the optical signal according to the optical switch compensation value of the optical signal, and send the optical signal to the optical switch switching matrix; and wherein the optical switch switching matrix is configured to receive the compensated optical signal sent by the second processor, and perform optical switching on the compensated optical signal.

16. The system according to claim 15, wherein the optical switch compensation value is an optical switch phase compensation value.

17. The system according to claim 15, wherein the optical switch compensation value is an optical switch polarization state compensation value.

18. The system according to claim 15, wherein the first processor is further configured to:
- detect an output value of a destination receive port, to which the optical signal is transmitted, of the optical switch switching matrix;
- obtain a difference value between the output value of the destination receive port and a preset target value of the optical signal; and:
- modify, in the preset optical switch configuration table, and in response to the difference value being greater than a preset modification threshold, the optical switch compensation value of the optical signal by using the number of the transmit port, to which the optical signal is transmitted, of the optical switch switching matrix and the number of the destination receive port as indexes.

19. The system according to claim 15, wherein the first processor is further configured to:
- detect a value that is obtained after the optical signal is compensated and an output value of a destination receive port, to which the optical signal is transmitted, of the optical switch switching matrix;
- obtain a difference value between the value that is obtained after the optical signal is compensated and the output value of the destination receive port; and
- modify, in the preset optical switch configuration table and in response to the difference value being greater than a preset modification threshold, the optical switch compensation value of the optical signal by using the number of the transmit port, to which the optical signal is transmitted, of the optical switch switching matrix and the number of the destination receive port as indexes.

* * * * *